United States Patent
Watanabe

(10) Patent No.: US 12,248,120 B2
(45) Date of Patent: Mar. 11, 2025

(54) LAMINATED BODY, METHOD OF MANUFACTURING LAMINATED BODY, ANTIFOGGING FILM FORMING COMPOSITION, ANTIFOGGING FILM, AND SET OF ANTIFOGGING FILM FORMING COMPOSITIONS

(71) Applicant: MITSUI CHEMICALS, INC., Tokyo (JP)

(72) Inventor: Makoto Watanabe, Omuta (JP)

(73) Assignee: MITSUI CHEMICALS, INC., Tokyo (JP)

( * ) Notice: Subject to any disclaimer, the term of this patent is extended or adjusted under 35 U.S.C. 154(b) by 380 days.

(21) Appl. No.: 17/676,321

(22) Filed: Feb. 21, 2022

(65) Prior Publication Data

US 2022/0276410 A1  Sep. 1, 2022

Related U.S. Application Data

(63) Continuation-in-part of application No. PCT/JP2020/042406, filed on Nov. 13, 2020.

(30) Foreign Application Priority Data

Nov. 15, 2019 (JP) ................. 2019-207311
Mar. 1, 2021 (JP) ................. 2021-032004

(51) Int. Cl.
  *G02B 1/10* (2015.01)
  *C03C 17/32* (2006.01)
  *G02B 1/04* (2006.01)

(52) U.S. Cl.
  CPC .............. *G02B 1/10* (2013.01); *C03C 17/326* (2013.01); *G02B 1/041* (2013.01)

(58) Field of Classification Search
  CPC .. G02B 1/00–1/18; B32B 27/00–27/42; C08L 63/00–63/10; C09D 163/00–163/10
  See application file for complete search history.

(56) References Cited

U.S. PATENT DOCUMENTS

| | | | |
|---|---|---|---|
| 2013/0260145 A1 | 10/2013 | Kishikawa et al. | |
| 2015/0111043 A1* | 4/2015 | Takimoto | C08G 59/4261 |
| | | | 427/302 |
| 2017/0015860 A1* | 1/2017 | Kodaira | C09D 5/00 |
| 2017/0015863 A1 | 1/2017 | Kodaira et al. | |
| 2019/0144405 A1 | 5/2019 | Qian | |
| 2020/0010665 A1 | 1/2020 | Oiki et al. | |

FOREIGN PATENT DOCUMENTS

| CN | 103538336 A | 1/2014 |
|---|---|---|
| CN | 106163796 A | 11/2016 |
| CN | 107619399 A | 1/2018 |
| EP | 3 505 345 A1 | 7/2019 |
| EP | 3 960 449 A1 | 3/2022 |
| JP | H1025468 A | 1/1998 |
| JP | 2004136525 A | 5/2004 |
| JP | 2006-063160 A | 3/2006 |
| JP | 2018-002865 A | 1/2018 |
| JP | 2018163340 A | 10/2018 |
| KR | 10-2019-0103466 A | 9/2019 |
| WO | 2012077686 A1 | 6/2012 |
| WO | 2020/217969 A1 | 10/2020 |

OTHER PUBLICATIONS

Machine translation of JP 2004136525. Retrieved Jul. 25, 2024.*

* cited by examiner

*Primary Examiner* — Prashant J Khatri
(74) *Attorney, Agent, or Firm* — BUCHANAN INGERSOLL & ROONEY PC

(57) ABSTRACT

A laminated body including: a substrate; a storage layer; and a buffer layer disposed in this order, in which the storage layer is formed of a cured product of a composition containing a polyfunctional monomer (a1), inorganic particles (a2), and a surfactant (a3), the buffer layer is formed of a cured product of a composition containing a polyfunctional monomer (b1) and inorganic particles (b2), a content mass of the inorganic particles (a2) is 30% by mass or more, a content mass of the inorganic particles (b2) is 30% by mass or more, and the polyfunctional monomer (a1) and the polyfunctional monomer (b1) contain a polyfunctional monomer having a molecular weight per epoxy group in one molecule of 200 g/mol or more.

18 Claims, No Drawings

LAMINATED BODY, METHOD OF MANUFACTURING LAMINATED BODY, ANTIFOGGING FILM FORMING COMPOSITION, ANTIFOGGING FILM, AND SET OF ANTIFOGGING FILM FORMING COMPOSITIONS

CROSS-REFERENCE TO RELATED APPLICATIONS

This application is a continuation-in-part application of International Application No. PCT/JP2020/042406, filed Nov. 13, 2020, which was published under PCT Article 21(2) in Japanese, and which claims priority from Japanese Patent Application No. 2019-207311, filed Nov. 15, 2019. This application also claims priority from Japanese Patent Application No. 2021-032004, filed Mar. 1, 2021. The above applications are expressly incorporated herein by reference, in their entireties.

TECHNICAL FIELD

The present disclosure relates to a laminated body, a method of manufacturing a laminated body, an antifogging film forming composition, an antifogging film, and a set of antifogging film forming compositions.

BACKGROUND ART

In recent years, there has been an increasing demand for improvement against fogging of substrates formed of an organic material such as plastic and an inorganic material such as glass.

As a method for solving the problem of fogging, for example, Patent Document 1 discloses an antifogging article including a base substrate and an antifogging film on at least a part of a surface of the base substrate, in which the antifogging film includes an underlying resin layer and a water-absorbing resin layer sequentially laminated on the surface of the base substrate, the water-absorbing resin layer is a water-absorbing resin layer mainly composed of a first cured epoxy resin obtained by reacting a composition for forming a water-absorbing resin layer which contains a specific polyepoxide component and a first curing agent, and the underlying resin layer is an underlying resin layer having water absorbency lower than that of the water-absorbing resin layer.

Patent Document 1: WO 2012/077686

SUMMARY OF INVENTION

Technical Problem

In a laminated body intended for antifogging using an epoxy resin, inorganic particles may be blended into the laminated body for the purpose of improving mechanical strength of the laminated body. In this case, the mechanical strength can be improved by increasing a content mass of the inorganic particles in the laminated body, but the antifogging properties of the laminated body tend to be deteriorated.

When the content mass of the inorganic particles in the laminate is decreased, the deterioration in antifogging properties of the laminated body can be suppressed, but the mechanical strength tends to be insufficient.

A laminated body intended for antifogging is required to achieve both a favorable mechanical strength and high antifogging properties while containing inorganic particles.

In the antifogging article of Patent Document 1, there is room for improvement in configuration of each layer, components contained in each layer, and the like from the viewpoint of achieving both a favorable mechanical strength and high antifogging properties.

An object of Embodiment A of the disclosure is to provide a laminated body having a favorable mechanical strength and excellent antifogging properties, a method of manufacturing the laminated body, an antifogging film forming composition, an antifogging film obtained by curing the composition, and a set of antifogging film forming compositions.

An object of Embodiment B of the disclosure is to provide a method of manufacturing an antifogging laminated body capable of manufacturing an antifogging laminated body by a simple method, an antifogging laminated body capable of being manufactured by a simple method, and a liquid composition capable of manufacturing an antifogging laminated body by a simple method.

Solution to Problem

Specific means of Embodiment A include the following aspects.

<1> A laminated body, including: a substrate; a storage layer (A); and a buffer layer (B) disposed in this order, wherein: the storage layer (A) is formed of a cured product of a composition (A-1) containing: a polyfunctional monomer (a1) containing two or more epoxy groups; inorganic particles (a2); and a surfactant (a3), the buffer layer (B) is formed of a cured product of a composition (B-1) containing: a polyfunctional monomer (b1) containing two or more epoxy groups; and inorganic particles (b2), a mass content of the inorganic particles (a2) with respect to a total mass of the storage layer (A) is 30% by mass or more, and a mass content of the inorganic particles (b2) with respect to a total mass of the buffer layer (B) is 30% by mass or more, the polyfunctional monomer (a1) contains a polyfunctional monomer (a1-1) having a molecular weight per epoxy group in one molecule of 200 g/mol or more, and the polyfunctional monomer (b1) contains a polyfunctional monomer (b1-1) having a molecular weight per epoxy group in one molecule of 200 g/mol or more.

<2> The laminated body according to <1>, wherein the mass content of the inorganic particles (b2) with respect to the total mass of the buffer layer (B) is larger than the mass content of the inorganic particles (a2) with respect to the total mass of the storage layer (A).

<3> The laminated body according to <1> or <2>, wherein each of the polyfunctional monomer (a1-1) and the polyfunctional monomer (b1-1) independently have an oxyalkylene structure.

<4> The laminated body according to any one of <1> to <3>, wherein each of the polyfunctional monomer (a1-1) and the polyfunctional monomer (b1-1) independently have a molecular weight of 500 g/mol or less per epoxy group in one molecule.

<5> The laminated body according to any one of <1> to <4>, wherein: the polyfunctional monomer (a1) contains a polyfunctional monomer (a1-2) having a molecular weight of less than 200 g/mol per epoxy group in one molecule, and the polyfunctional monomer (b1) contains a polyfunctional monomer (b1-2) having a molecular weight of less than 200 g/mol per epoxy group in one molecule.

<6> The laminated body according to <5>, wherein each of the polyfunctional monomer (a1-2) and the polyfunctional monomer (b1-2) independently contain a compound represented by the following Formula (1):

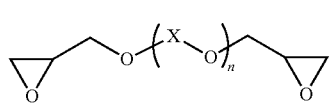

In Formula (1), X represents an alkylene group having from 2 to 6 carbon atoms, and n is an integer from 1 to 5.

In Formula (1), when n is an integer from 2 to 5, a plurality of each X may be the same as or different from another X.

<7> The laminated body according to any one of <1> to <6>, wherein the mass content of the inorganic particles (a2) with respect to the total mass of the storage layer (A) is from 30% by mass to 60% by mass, and the mass content of the inorganic particles (b2) with respect to the total mass of the buffer layer (B) is from 40% by mass to 70% by mass.

<8> The laminated body according to any one of <1> to <7>, wherein a mass content of the surfactant (a3) with respect to the total mass of the storage layer (A) is from 1.0% by mass to 5.0% by mass, and the buffer layer (B) contains no surfactant, or a content mass of the surfactant (b3) with respect to the total mass of the buffer layer (B) is from more than 0% by mass to less than 1.0% by mass.

<9> The laminated body according to any one of <1> to <8>, wherein: the composition (A-1) further contains a polyfunctional monomer (a4) containing an oxetane ring, and the composition (B-1) further contains a polyfunctional monomer (b4) containing an oxetane ring.

<10> The laminated body according to any one of <1> to <9>, wherein each of the composition (A-1) and the composition (B-1) independently contain at least one of a thermal polymerization initiator or a photopolymerization initiator as a polymerization initiator.

<11> The laminated body according to any one of <1> to <10>, wherein each of the composition (A-1) and the composition (B-1) independently contain silica particles and contain an aluminum chelator and a thermal acid generator as the thermal polymerization initiator.

<12> The laminated body according to any one of <1> to <11>, wherein a ratio of a thickness of the storage layer (A) to a thickness of the buffer layer (B) is in a range of from 1.3 to 15.

<13> The laminated body according to any one of <1> to <12>, wherein the substrate comprises a plastic lens.

<14> The laminated body according to any one of <1> to <13>, wherein a total mass content of the polyfunctional monomer (a1), the inorganic particles (a2), the surfactant (a3), and the polymerization initiator in the composition (A-1) is 95% by mass or more with respect to a total mass of the composition (A-1), and a total mass content of the polyfunctional monomer (b1), the inorganic particles (b2), the surfactant (b3), and the polymerization initiator in the composition (B-1) is 95% by mass or more with respect to a total mass of the composition (B-1).

<15> A method of manufacturing a laminated body, the method including: a step (S1) of providing a coating material layer (A2) of a composition (A-1a) containing a polyfunctional monomer (a1) containing two or more epoxy groups, inorganic particles (a2), a surfactant (a3), and a solvent (a4) on at least one surface of a substrate; a step (S2) of removing the solvent (a4) from the coating material layer (A2); a step (S3) of curing the coating material layer (A2) to obtain a storage layer (A); a step (S4) of providing a coating material layer (B2) of a composition (B-1a) containing a polyfunctional monomer (b1) containing two or more epoxy groups, inorganic particles (b2), a surfactant (b3), and a solvent (b4) on the storage layer (A) after the step (S3); a step (S5) of removing the solvent (b4) from the coating material layer (B2); and a step (S6) of curing the coating material layer (B2) to obtain a buffer layer (B).

<16> The method of manufacturing a laminated body according to <15>, wherein a total dry mass of the composition (A-1) per 100 parts by mass of the composition (A-1) is from 46 parts by mass to less than 100 parts by mass.

<17> A composition for forming an antifogging film, the composition containing: a polyfunctional monomer (x1) containing two or more epoxy groups; inorganic particles (x2); and a surfactant (x3) wherein: a mass content of the inorganic particles (x2) with respect to a total dry mass of the composition is 30% by mass or more, and the polyfunctional monomer (x1) contains a polyfunctional monomer (x1-1) having a molecular weight per epoxy group in one molecule of 200 g/mol or more.

<18> An antifogging film obtained by curing the composition for forming an antifogging film according to <17>.

Specific means of Embodiment B include the following aspect.

<19> A method of manufacturing an antifogging laminated body, the method including:
preparing a laminated body including a substrate and a storage layer (A), wherein the storage layer (A) contains a resin (a100) that is at least one of an epoxy resin or an acrylic resin, inorganic particles (a2), and a nonionic surfactant (a300); and applying a liquid composition containing an ionic surfactant to a surface of the laminated body at a side at which the storage layer (A) is disposed.

Advantageous Effects of Invention

An embodiment of Embodiment A can provide a laminated body having a favorable mechanical strength and excellent antifogging properties, a method of manufacturing the laminated body, an antifogging film forming composition, an antifogging film obtained by curing the composition, and a set of antifogging film forming compositions.

An embodiment of Embodiment B can provide a method of manufacturing an antifogging laminated body capable of manufacturing an antifogging laminated body by a simple method, an antifogging laminated body capable of being manufactured by a simple method, and a liquid composition capable of manufacturing an antifogging laminated body by a simple method.

DESCRIPTION OF EMBODIMENTS

In the disclosure, a numerical range indicated using "to" means a range including numerical values described before and after "to" as a minimum value and a maximum value, respectively.

In the numerical ranges described in stages in the disclosure, the upper limit value or the lower limit value described in a numerical range may be replaced with the upper limit value or the lower limit value of any other numerical range described in stages. In addition, in numerical ranges described in the disclosure, the upper limit values or the lower limit values indicated as numerical ranges may be replaced with values shown in Examples.

In the disclosure, a combination of two or more preferred aspects is a more preferred aspect.

In the present disclosure, if there are a plurality of substances corresponding to each component, the amount of each component means a total amount of the plurality of substances unless otherwise specified.

In the disclosure, the term "step" includes not only an independent step but also a step that cannot be clearly distinguished from other steps as long as the purpose of step is achieved.

The present disclosure includes Embodiment A and Embodiment B.

Hereinafter, Embodiment A and Embodiment B will be described in detail.

Embodiment A

<<Laminated Body>>

The laminated body of Embodiment A includes: a substrate; a storage layer (A); and a buffer layer (B) disposed in this order.

The storage layer (A) is formed of a cured product of a composition (A-1) containing: a polyfunctional monomer (a1) containing two or more epoxy groups; inorganic particles (a2); and a surfactant (a3).

The buffer layer (B) is formed of a cured product of a composition (B-1) containing: a polyfunctional monomer (b1) containing two or more epoxy groups; and inorganic particles (b2).

A content mass of the inorganic particles (a2) with respect to a total mass of the storage layer (A) is 30% by mass or more.

A content mass of the inorganic particles (b2) with respect to a total mass of the buffer layer (B) is 30% by mass or more.

The polyfunctional monomer (a1) contains a polyfunctional monomer (a1-1) having a molecular weight per epoxy group in one molecule (hereinafter referred to also as "epoxy equivalent") of 200 g/mol or more.

The polyfunctional monomer (b1) contains a polyfunctional monomer (b1-1) having a molecular weight per epoxy group in one molecule of 200 g/mol or more.

As described above, in a laminated body using an epoxy resin for the purpose of antifogging, the mechanical strength can be improved by increasing the content mass of the inorganic particles in the laminated body, but the antifogging properties of the laminated body tend to decrease.

When the content mass of the inorganic particles in the laminate is decreased, the deterioration in antifogging properties of the laminated body can be suppressed, but the mechanical strength tends to be insufficient.

As a result of intensive studies by the present inventor, the following findings have been obtained.

First, in order for the laminated body to obtain the antifogging properties, it is considered that the surfactant contained in the laminated body improves the hydrophilicity on a surface of the laminated body, thereby making it possible to improve the antifogging properties.

When the content mass of the inorganic particles in the layer is increased, the amount of the water-absorbing monomer contained in the laminated body is relatively reduced. As a result, water adsorbed to the surface cannot be sufficiently absorbed into the film, leading to difficulty in obtaining sufficient antifogging properties.

As a result, it is considered that the antifogging properties of the laminated body are deteriorated when the content mass of the inorganic particles in the layer is increased.

On the other hand, when the content of the inorganic particles is reduced, it is difficult to obtain mechanical strength due to the inorganic particles themselves, and, further, to obtain sufficient crosslinkability in a network of a crosslinked structure by the monomer and the inorganic particles, whereby it is more difficult to obtain mechanical strength.

When a crosslinking density of the crosslinked structure is too high, the surfactant present in the laminated body cannot appropriately move from the inside of the laminated body to the surface of the laminated body.

Due to the above configuration, the laminated body of Embodiment A can include a substrate, a storage layer (A), and a buffer layer (B) disposed in this order, and inorganic particles having a content mass of a specific value or more and a polyfunctional monomer having an epoxy equivalent of a specific value or more can be included in each of the storage layer (A) and the buffer layer (B).

Thus, the network of the crosslinked structure formed by the inorganic particles and the polyfunctional monomer can be formed, and, due to the network of the crosslinked structure, the surfactant can be moved to a surface of the buffer layer (B) while the surfactant is appropriately retained in the storage layer (A).

Hence, the laminated body of Embodiment A has a favorable mechanical strength and excellent antifogging properties.

In Embodiment A, the "total dry mass" for a composition refers to a total mass of components of the composition except the solvent component, unless otherwise specified.

Also, the "total dry mass" for the composition (A-1) corresponds to the total mass of the storage layer (A) and the "total dry mass" for the composition (B-1) corresponds to the total mass of the buffer layer (B).

Hereinafter, each layer of the laminated body of Embodiment A will be described.

<Storage Layer (A)>

In the laminated body of Embodiment A, the storage layer (A) is formed of a cured product of a composition (A-1) containing a polyfunctional monomer (a1) containing two or more epoxy groups, inorganic particles (a2), and a surfactant (a3).

The storage layer (A) stores the surfactant (a3) therein, and serves to continuously supply the surfactant (a3) to the surface of the laminated body of Embodiment A through the buffer layer (B) which will be described below.

Thus, the laminated body of Embodiment A can exhibit high antifogging properties.

<Polyfunctional Monomer (a1)>

The composition (A-1) in Embodiment A contains a polyfunctional monomer (a1) containing two or more epoxy groups.

In Embodiment A, the polyfunctional monomers (a1) each containing two or more epoxy groups are bonded to each other through curing by a crosslinking reaction of the composition (A-1). A network structure formed by the above bonds can give a basic skeleton to the storage layer (A), and can give the storage layer (A) a space for storing the surfactant (a3).

That is, the polyfunctional monomer (a1) is converted into a corresponding polymer through curing of the composition (A-1), and constitutes a polymer component in the storage layer (A).

The polyfunctional monomer (a1) used in Embodiment A contains two or more epoxy groups and a linker moiety that fixes the two or more epoxy groups in one molecule.

<Epoxy Equivalent>

The polyfunctional monomer (a1) in Embodiment A contains a polyfunctional monomer (a1-1) having a molecular weight per epoxy group in one molecule (hereinafter referred to also as epoxy equivalent) of 200 g/mol or more.

When the polyfunctional monomer (a1) contains the polyfunctional monomer (a1-1) having an epoxy equivalent of 200 g/mol or more, it is possible to reduce a number of reaction points in the crosslinking reaction while ensuring the molecular weight required for layer formation. This enables the storage layer to easily retain moisture, that is, to be improved in water absorbing properties, and thus the antifogging properties of the laminated body can be improved.

From the same viewpoint as described above, the epoxy equivalent of the polyfunctional monomer (a1-1) is preferably 300 g/mol or more, and more preferably 350 g/mol or more.

The polyfunctional monomer (a1-1) preferably has an epoxy equivalent of 500 g/mol or less. When the epoxy equivalent of the polyfunctional monomer (a1-1) is 500 g/mol or less, the crosslinking reaction can be favorably promoted, so that a laminated body having favorable scratch resistance can be obtained.

From the same viewpoint as described above, the epoxy equivalent of the polyfunctional monomer (a1-1) is more preferably 450 g/mol or less.

The polyfunctional monomer (a1-1) may contain any other substituent, structure, or the like as long as it contains two or more epoxy groups and has an epoxy equivalent of 200 g/mol or more.

For example, the polyfunctional monomer (a1-1) may include an alkanepolyol structure such as an alkanediol or an alkanetriol, and may also include a polyoxyalkylene structure such as a polyoxyalkylene glycol (for example, polyethylene glycol) or a compound obtained by adding a polyoxyalkylene to an alkane polyol.

Among these structures, the polyfunctional monomer (a1-1) preferably has an oxyalkylene structure from the viewpoint of improving water absorbing properties to obtain favorable antifogging properties.

The oxyalkylene structure may have a hydrophilic group as a substituent.

When the oxyalkylene structure has a hydrophilic group, the water absorbing properties of the laminated body can be improved.

Examples of the hydrophilic group include a hydroxyl group, a carboxy group, and a sulfonic acid group.

Among these groups, the hydrophilic group is preferably a hydroxyl group, and more preferably a diol.

Examples of the polyfunctional monomer (a1-1) include diols having a polyoxyethylene structure.

The oxyalkylene structure preferably has an ether bond.

When the oxyalkylene structure has an ether bond, the water absorbing properties of the laminated body can be improved, so that better antifogging properties can be obtained.

The polyfunctional monomer (a1-1) may further contain an aromatic ring, or may be an alicyclic compound.

Examples of the polyfunctional monomer (a1-1) containing an aromatic ring include an ethylene oxide adduct of bisphenol.

The linker moiety of the polyfunctional monomer (a1-1) preferably has a chain structure from the viewpoint of improving the antifogging properties.

The molecular weight of the polyfunctional monomer (a1-1) is preferably from 300 to 2000, and more preferably from 300 to 1000.

As the polyfunctional monomer (a1-1), a commercially available product may be used, and examples thereof include DENACOL EX-841 (manufactured by Nagase ChemteX Corporation).

The polyfunctional monomer (a1) preferably contains, in addition to the polyfunctional monomer (a1-1), a polyfunctional monomer (a1-2) having an epoxy equivalent of less than 200 g/mol.

When the polyfunctional monomer (a1) contains the polyfunctional monomer (a1-2) having an epoxy equivalent of less than 200 g/mol, it is possible to increase the number of reaction points in the crosslinking reaction and thus to improve a degree of crosslinking. As a result, the scratch resistance of the laminated body can be improved.

The polyfunctional monomer (a1-2) preferably contains a compound represented by the following Formula (1).

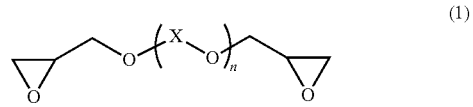

In Formula (1), X is an alkylene group having from 2 to 6 carbon atoms, and n is an integer from 1 to 5.

In Formula (1), when n is an integer from 2 to 5, a plurality of Xs may be the same or different.

In Formula (1), the alkylene group having from 2 to 6 carbon atoms as X is preferably an alkylene group having 2 or 3 carbon atoms.

The alkylene group having from 2 to 6 carbon atoms may have or need not have a substituent. Examples of the substituent include a hydrophilic group (a hydroxyl group, a carboxyl groups, etc.), a glycidyl ether group, and an alkyl group having a hydrophilic group or a glycidyl ether group.

The molecular weight of the polyfunctional monomer (a1-2) is preferably from 100 to 2000, and more preferably from 150 to 1500.

The polyfunctional monomer (a1) used in Embodiment A may be used singly or in combination of two or more kinds thereof.

A content mass of the polyfunctional monomer (a1) forming the storage layer (A) is preferably from 30% by mass to 70% by mass, and more preferably from 45% by mass to 60% by mass with respect to a total mass of the storage layer (A).

When a plurality of monomers are contained as the polyfunctional monomer (a1) in the composition (A-1), the content mass of the polyfunctional monomer (a1) with respect to the total mass of the storage layer (A) means a total content mass of all the monomers contained as the polyfunctional monomer (a1).

A content mass of the polyfunctional monomer (a1-1) with respect to a total content mass of the polyfunctional monomer (a1-1) and the polyfunctional monomer (a1-2) is preferably from 5% by mass to 50% by mass, and preferably from 10% by mass to 40% by mass.

The content mass of the polyfunctional monomer (a1) with respect to a content mass of all the monomers forming the storage layer (A) is preferably 70% by mass or more, and more preferably 75% by mass or more.

The composition (A-1) preferably further contains a polyfunctional monomer (a4) containing an oxetane ring.

This can further improve the degree of crosslinking between the polyfunctional monomers, so that the scratch resistance of the laminated body can be further improved.

The polyfunctional monomer (a4) preferably contains two oxetane rings. The polyfunctional monomer (a4) preferably contains an ether bond (except an ether bond of the oxetane ring).

Examples of the polyfunctional monomer (a4) include ARON OXETANE OXT-221 (TOAGOSEI CO., LTD.).

A content mass of the polyfunctional monomer (a4) containing an oxetane ring is preferably 2% by mass or more, and more preferably 4% by mass or more with respect to the total mass of the storage layer (A) from the viewpoint of further improving the scratch resistance of the laminated body.

The content mass of the polyfunctional monomer (a4) containing an oxetane ring is preferably 10% by mass or less, and more preferably 8% by mass or less with respect to the total mass of the storage layer (A) from the viewpoint of favorably maintaining the antifogging properties of the laminated body.

A total content mass of the polyfunctional monomer (a1) and the polyfunctional monomer (a4) with respect to the content mass of all the monomers forming the storage layer (A) is preferably 90% by mass or more, and more preferably 95% by mass or more.

<Inorganic Particles (a2)>

The composition (A-1) in Embodiment A contains inorganic particles (a2).

In Embodiment A, the inorganic particles (a2) are present inside the storage layer (A) so as to be incorporated into the network structure formed by bonding the polyfunctional monomers (a1) to each other. This makes it possible to improve hardness and strength of the storage layer (A).

The inorganic particles (a2) used in Embodiment A may be inorganic particles (a2-0) (hereinafter, simply referred to also as "inorganic particles (a2-0)") that are not modified with a functional group including an epoxy group, or may be inorganic particles (a2-1) (hereinafter, simply referred to also as "inorganic particles (a2-1)") that are modified with a functional group including an epoxy group.

In one aspect of Embodiment A, the inorganic particles (a2-0) are unmodified inorganic particles. That is, the inorganic particles (a2-0) are particles substantially consisting only of an inorganic substance.

The "particles substantially consisting only of an inorganic substance" does not mean that a content mass of an organic substance in the inorganic particles (a2-0) is strictly 0. That is, the inorganic particles (a2-0) may contain an organic substance that is not reactive with other components in a trace amount to such an extent that physical properties inherent in the inorganic substance as a component of the inorganic particles (a2-0) are not affected.

For example, the inorganic particles (a2-0) may contain a trace amount of organic substance that can be unavoidably mixed due to a manufacturing step, a trace amount of organic substance derived from the atmosphere that can be unavoidably non-specifically adsorbed to the surfaces thereof by being left standing in the atmosphere, and the like.

Examples of the inorganic substance as a component of the inorganic particles (a2-0) include metal oxides such as silica, zirconia, alumina, tin oxide, antimony oxide, and titania, and nanodiamond particles.

Among these substances, silica and zirconia are preferable as the inorganic substance as a component of the inorganic particles (a2-0) from the viewpoint of dispersibility in a resin obtained from the polyfunctional monomer (a1), hardness of the laminated body, and light resistance.

A particle size of the inorganic particles (a2-0) is preferably from 5 nm to 50 nm.

When the particle size of the inorganic particles (a2-0) is 5 nm or more, the hardness of the laminated body can be improved. In addition, the dispersibility of the particles in the composition (A-1) can be improved.

On the other hand, when the particle size of the inorganic particles (a2-0) is 50 nm or less, transparency of the composition (A-1) when formed as a cured product can be improved.

The particle size of the inorganic particles (a2-0) is more preferably from 10 nm to 30 nm.

The particle size of the inorganic particles (a2-0) is measured by performing a dynamic scattering method with laser light.

The inorganic particles (a2-0) may be used singly or in combination of two or more kinds thereof.

The inorganic particles (a2-0) are commercially available, and examples thereof include PGM-ST manufactured by Nissan Chemical Corporation.

In one aspect of Embodiment A, the inorganic particles (a2) may be inorganic particles (a2-1) modified with a functional group including an epoxy group.

The inorganic particles (a2-1) are particles including the inorganic particles (a2-0) as basic particles and having a functional group including an epoxy group on surfaces of the basic particles.

In the above aspect, during curing of the composition (A-1), the epoxy group included in the inorganic particles (a2-1) forms a covalent bond with the epoxy group included in the polyfunctional monomer (a1). Therefore, in the storage layer (A) obtained from the composition (A-1), the inorganic particles (a2-1) are integrated with the network structure formed by bonding the polyfunctional monomers (a1) to each other through a covalent bond.

Suitable examples of the inorganic particles (a2-1) include silica particles modified with a functional group including an epoxy group and zirconia particles modified with a functional group including an epoxy group.

The "functional group including an epoxy group" included in the inorganic particles (a2-1) has an epoxy group at a terminal thereof, and further has a linking group for linking the epoxy group and the basic particles.

The inorganic particles (a2-0) may be used singly or in combination of two or more kinds thereof.

In Embodiment A, a content mass of the inorganic particles (a2) with respect to the total mass of the storage layer (A) is 30% by mass or more.

This can improve the scratch resistance of the obtained laminated body.

From the same viewpoint as described above, the content mass of the inorganic particles (a2) with respect to the total mass of the storage layer (A) is preferably 40% by mass or more, and more preferably 50% by mass or more.

An upper limit of the content mass of the inorganic particles (a2) with respect to the total mass of the storage layer (A) is not particularly limited, and the content mass of the inorganic particles (a2) with respect to the total mass of the storage layer (A) may be, for example, 70% by mass or less, or 60% by mass or less.

As for proportions of the inorganic particles (a2-0) and the inorganic particles (a2-1) when the inorganic particles (a2) contains both the inorganic particles (a2-0) and the inorganic particles (a2-1), the amount of the inorganic particles (a2-0) is preferably from more than 0% by mass to 30% by mass, and the amount of the inorganic particles (a2-1) is preferably from 70% by mass to less than 100% by mass, when a total mass of the inorganic particles (a2-0) and the inorganic particles (a2-1) is 100% by mass.

In Embodiment A, a proportion of the inorganic particles (a2) to the polyfunctional monomer (a1) forming the storage layer (A) is preferably in a range of from 0.6/1 to 1/1 as a ratio of the content mass of the inorganic particles (a2) to the content mass of the polyfunctional monomer (a1) in the composition (A-1).

The inorganic particles (a2-1) are commercially available, and examples thereof include MEK-EC-2430Z manufactured by Nissan Chemical Corporation.

<Surfactant (a3)>

The composition (A-1) in Embodiment A contains a surfactant (a3).

In Embodiment A, the surfactant (a3) is stored inside the storage layer (A), and exudes to the surface of the laminated body of Embodiment A through the buffer layer (B) which will be described later, thereby playing a role of imparting antifogging properties to the laminated body of Embodiment A.

The surfactant (a3) is not particularly limited as long as it is a surfactant capable of achieving this role.

In a preferred aspect of Embodiment A, the surfactant (a3) has a polyoxyalkylene structure.

In an aspect of Embodiment A, the surfactant (a3) may include a hydrocarbon group and a polyoxyalkylene structure.

Examples of the hydrocarbon group include an alkyl group and an alkenyl group.

In a preferred aspect of Embodiment A, the surfactant (a3) further has an anionic hydrophilic group.

Examples of the surfactant (a3) having an anionic hydrophilic group include a polyoxyalkylene alkyl ether sulfate, a polyoxyalkylene alkenyl ether sulfate, and a mixture thereof.

The surfactant (a3) used in Embodiment A may be a nonionic surfactant having a polyoxyalkylene structure.

Examples of the nonionic surfactant having a polyoxyalkylene structure include polyoxyalkylene alkyl ethers such as polyoxyalkylene monoalkyl ethers, polyoxyalkylene alkenyl ethers such as polyoxyalkylene monoalkenyl ethers, and mixtures thereof.

In an exemplary aspect of Embodiment A, the polyoxyalkylene alkyl ether may be a polyoxyethylene alkyl ether. Specific examples of the polyoxyethylene alkyl ether include polyoxyethylene isodecyl ether and polyoxyethylene lauryl ether.

The surfactant (a3) used in Embodiment A may be used singly or in combination of two or more kinds thereof.

A content mass of the surfactant (a3) with respect to the total mass of the storage layer (A) is preferably from 1.0% by mass to 5.0% by mass, and more preferably from 1.5% by mass to 3.0% by mass.

As the surfactant (a3), a commercially available product may be used, and examples thereof include NOIGEN LP-100 (polyoxyalkylene lauryl ether manufactured by DKS Co., Ltd.).

<Any Other Surfactant>

In Embodiment A, the composition (A-1) may further contain any other surfactant that does not correspond to the surfactant (a3) (hereinafter, "any other surfactant"), in addition to the surfactant (a3), according to the configuration, intended use, and the like of the laminated body of Embodiment A.

The "any other surfactant" is not particularly limited as long as it does not correspond to the surfactant (a3), and may be a conventionally known surfactant.

A content mass of the "any other surfactant" is preferably from more than 0% by mass to 0.05% by mass, and more preferably from 0.25% by mass to 0.35% by mass with respect to the total mass of the storage layer (A).

The "any other surfactant" that can be contained in the composition (A-1) may be used singly or in combination of two or more kinds thereof <Polymerization Initiator>

The composition (A-1) preferably contains a polymerization initiator.

As the polymerization initiator, at least one of a thermal polymerization initiator and a photopolymerization initiator is preferable, and a thermal polymerization initiator is preferable.

As the thermal polymerization initiator, a known thermal polymerization initiator can be used.

Examples of the known thermal polymerization initiator include ketone peroxides, diacyl peroxides, dialkyl peroxides, peroxyketals, alkyl peresters, percarbonates, aluminum chelators, and thermal acid generators.

Among these materials, an aluminum chelator and a thermal acid generator are preferable as the thermal polymerization initiator from the viewpoint of improving the scratch resistance.

Examples of the aluminum chelator include Alumichelate A(W) (manufactured by Kawaken Fine Chemicals Co., Ltd.).

Examples of the thermal acid generator include San Aid SI-60L (manufactured by Sanshin Chemical Industry Co., Ltd.).

Examples of the photopolymerization initiator include a photoradical polymerization initiator, a photocationic polymerization initiator, and a photoanionic polymerization initiator, and, among the photopolymerization initiators, a photocationic polymerization initiator is preferable. In particular, when the storage layer (A) is obtained by a spin coating method, a photocationic polymerization initiator can be preferably used as the photopolymerization initiator.

Examples of the photocationic polymerization initiator include San-Apro CP-210S (Sanyo Chemical Industries, Ltd.).

Amounts of the photopolymerization initiator, a photopolymerization accelerator, and the thermal polymerization initiator used are preferably from 1% by mass to 5% by mass, and more preferably from 2% by mass to 3% by mass, with respect to the total mass of the storage layer (A).

When the storage layer (A) is formed by application, the thickness of the storage layer (A) can be adjusted by adjusting the amount of the solvent (a4) contained in the composition (A-1).

A total dry mass of the composition (A-1) per 100 parts by mass of the composition (A-1) is preferably 46 parts by mass or more.

This leads to a further increase in thickness of the obtained storage layer (A), so that the deterioration in antifogging properties after water washing is further suppressed.

From the same viewpoint as described above, the total dry mass of the composition (A-1) per 100 parts by mass of the composition (A-1) is more preferably 55 parts by mass or more.

On the other hand, the total dry mass of the composition (A-1) per 100 parts by mass of the composition (A-1) is less than 100 parts by mass, and is preferably 65 parts by mass or less from the viewpoint of further improving the fluidity required for application.

<Solvent>

The composition (A-1) may contain a solvent.

The composition (A-1) may contain the solvent singly or in combination of two or more kinds thereof.

The solvent is not particularly limited, but is preferably a solvent in which the components of the composition (A-1) that is cured to form the storage layer (A) are not separated.

Examples of the solvent include alcohols such as methanol, ethanol, n-propanol, isopropanol, n-butanol, isobutanol, t-butanol, n-pentanol, isopentanol, n-hexanol, n-octanol, 2-ethyl-hexanol, 2-methoxyethanol, 2-ethoxyethanol, 2-n-propoxyethanol, 2-isopropoxyethanol, 2-butoxyethanol, 1-methoxy-2 propanol (also referred to as propylene glycol monomethyl ether), 1-ethoxy-2-propanol (also referred to as propylene glycol monoethyl ether), 1-n-propoxy-2-propanol, 1-isopropoxy-2-propanol, and cyclohexanol, ethers such as diethyl ether, tetrahydrofuran, and dioxane, nitriles such as acetonitrile, esters such as ethyl acetate, n-propyl acetate, and n-butyl acetate, ketones such as acetone, methyl ethyl ketone, and methyl isobutyl ketone, amides such as N,N-dimethylformamide and N,N-dimethylacetamide, and water.

The solvent is preferably an alcohol, a ketone, or a mixed solvent of an alcohol and a ketone.

It is preferable that a total content mass of the polyfunctional monomer (a1), the inorganic particles (a2), the surfactant (a3), and the polymerization initiator in the composition (A-1) is 95% by mass or more with respect to the total mass of the composition (A-1), and that a total content mass of the polyfunctional monomer (b1), the inorganic particles (b2), the surfactant (b3), and the polymerization initiator in the composition (B-1) is 95% by mass or more with respect to a total mass of the composition (B-1).

<Configuration of Storage Layer (A)>

In Embodiment A, the storage layer (A) can be obtained by curing the composition (A-1) containing the polyfunctional monomer (a1), the inorganic particles (a2), and the surfactant (a3). That is, the storage layer (A) is a cured product of the composition (A-1).

A shape of the storage layer (A) in Embodiment A may be a plate shape or a film shape.

From the viewpoint that the laminated body exhibits sufficient antifogging properties even after water washing, a thickness of the storage layer (A) is preferably 4.0 μm or more, and more preferably 5.3 μm or more.

Since the amount of the surfactant contained in the storage layer (A) increases as the thickness of the storage layer (A) increases, the antifogging properties and antifogging durability tend to be improved. Therefore, an upper limit of the thickness of the storage layer (A) is not particularly limited as long as the function of the laminated body of Embodiment A is not impaired.

From the viewpoint of coatability, the thickness of the storage layer (A) may be 30 μm or less or 20 μm or less.

<Buffer Layer (B)>

In the laminated body of Embodiment A, the buffer layer (B) is formed of a cured product of a composition (B-1) containing a polyfunctional monomer (b1) containing two or more epoxy groups and inorganic particles (b2).

The composition (B-1) does not necessarily contain a surfactant, unlike the composition (A-1). However, in Embodiment A, the composition (B-1) preferably further contains a surfactant (b3).

The buffer layer (B) preferably has a higher hardness than that of the storage layer (A).

This can impart favorable scratch resistance to the laminated body of Embodiment A.

The surfactant (a3) stored in the storage layer (A) exudes to the outside so that the laminated body of Embodiment A exhibits high antifogging properties, and the buffer layer (B) also plays a role of controlling an exudation rate of the surfactant (a3).

Hence, the laminated body of Embodiment A not only has high antifogging properties, but also can maintain high antifogging properties even after repeated washing with water.

Examples of a method of controlling the exudation rate include a method in which a mass ratio (filler/matrix ratio) of the inorganic particles to the polymer component (in particular, the polymer component corresponding to the polyfunctional monomer) in the buffer layer (B) is made sufficiently larger than that in the storage layer (A), and a method in which after the composition (B-1) for forming the buffer layer (B) is applied, the solvent contained in the applied composition (B-1) is removed by heating or the like, and then the applied composition (B-1) is cured.

<Polyfunctional Monomer (b1)>

The composition (B-1) in Embodiment A contains a polyfunctional monomer (b1) containing two or more epoxy groups. The polyfunctional monomer (b1) contains a polyfunctional monomer (b1-1) having a molecular weight per epoxy group in one molecule of 200 g/mol or more.

Examples of the polyfunctional monomer (b1) in Embodiment A include the same specific examples as those listed for the polyfunctional monomer (a1). In addition, acceptable aspect and preferred aspects of the polyfunctional monomer (b1) in Embodiment A are the same as the acceptable aspect and the preferred aspect listed for the polyfunctional monomer (a1), and the same may apply to the preferred content mass.

For example, similarly to the polyfunctional monomer (a1), the polyfunctional monomer (b1) preferably contains a polyfunctional monomer (b1-2) having an epoxy equivalent of less than 200 g/mol, in addition to the polyfunctional monomer (b1-1).

The polyfunctional monomer (b1-2) preferably contains a compound represented by the above Formula (1).

Examples of the polyfunctional monomer (b1-1) in Embodiment A include the same specific examples as those listed for the polyfunctional monomer (a1-1). In addition, acceptable aspect and preferred aspects of the polyfunctional monomer (b1-1) in Embodiment A are the same as the acceptable aspect and the preferred aspect listed for the polyfunctional monomer (a1-1), and the same may apply to the preferred content mass.

For example, a content mass of the polyfunctional monomer (b1-1) with respect to a total content of the polyfunctional monomer (b1-1) and the polyfunctional monomer (b1-2) is the same as the content mass of the polyfunctional monomer (a1-1) with respect to the total content of the polyfunctional monomer (a1-1) and the polyfunctional monomer (a1-2), and the same may apply to the preferred range.

For example, a content mass of the polyfunctional monomer (b1 with respect to a content mass of all the monomers forming the buffer layer (B) is the same as the content mass of the polyfunctional monomer (a1) with respect to the content mass of all the monomers forming the storage layer (A), and the same may apply to the preferred range.

For example, a total content mass of the polyfunctional monomer (b1) and the polyfunctional monomer (b4) with respect to the content mass of all the monomers forming the buffer layer (B) is the same as the total content mass of the polyfunctional monomer (a1) and the polyfunctional monomer (a4) with respect to the content mass of all the monomers forming the storage layer (A), and the same may apply to the preferred range.

For example, a preferred range of the epoxy equivalent in the polyfunctional monomer (b1-1) is the same as the preferred range of the epoxy equivalent in the polyfunctional monomer (a1-1).

For example, similarly to the polyfunctional monomer (a1-1), the polyfunctional monomer (b1-1) preferably includes an oxyalkylene structure.

For example, similarly to the polyfunctional monomer (a1-1), the oxyalkylene structure that can be included in the polyfunctional monomer (b1-1) may have a hydrophilic group as a substituent.

For example, similarly to the polyfunctional monomer (a1-1), the oxyalkylene structure that can be included in the polyfunctional monomer (b1-1) preferably has an ether bond.

Similarly to the composition (A-1), the composition (B-1) preferably further contains a polyfunctional monomer (b4) containing an oxetane ring.

A preferred range of a content mass of the polyfunctional monomer (b4) containing an oxetane ring with respect to the total mass of the buffer layer (B) is the same as the preferred range of the content mass of the polyfunctional monomer (a4) containing an oxetane ring with respect to the storage layer (A).

The following aspects are suitable for the polyfunctional monomer (a1) and the polyfunctional monomer (b1), the polyfunctional monomer (a1-1) and the polyfunctional monomer (b1-1), the polyfunctional monomer (a1-2) and the polyfunctional monomer (b1-2), and the composition (A-1) and the composition (B-1) in Embodiment A.

As described above, in the laminated body of Embodiment A, a content of the polyfunctional monomer (b1) may be the same as that in the acceptable aspect indicated for the polyfunctional monomer (a1), but the content mass of the polyfunctional monomer (b1) forming the buffer layer (B) is more preferably from 30% by mass to 70% by mass, still more preferably from 25% by mass to 47.5% by mass with respect to the total mass of the buffer layer (B).

In the laminated body of Embodiment A, it is preferable that each of the polyfunctional monomer (a1-1) and the polyfunctional monomer (b1-1) independently have a molecular weight per epoxy group in one molecule of 300 g/mol or more.

In the laminated body of Embodiment A, it is preferable that each of the polyfunctional monomer (a1-1) and the polyfunctional monomer (b1-1) independently have a molecular weight per epoxy group in one molecule of 500 g/mol or less.

In the laminated body of Embodiment A, it is preferable that the polyfunctional monomer (a1) contains a polyfunctional monomer (a1-2) having a molecular weight per epoxy group in one molecule of less than 200 g/mol, and that the polyfunctional monomer (b1) contains a polyfunctional monomer (b1-2) having a molecular weight per epoxy group in one molecule of less than 200 g/mol.

In the laminated body of Embodiment A, it is preferable that each of the polyfunctional monomer (a1-1) and the polyfunctional monomer (b1-1) independently include an oxyalkylene structure.

In the laminated body of Embodiment A, it is preferable that the composition (A-1) further contains the polyfunctional monomer (a4) containing an oxetane ring, and that the composition (B-1) further contains the polyfunctional monomer (b4) containing an oxetane ring.

<Inorganic Particles (b2)>

The composition (B-1) in Embodiment A contains inorganic particles (b2).

A content mass of the inorganic particles (b2) is 30% by mass or more with respect to the total mass of the buffer layer (B).

The inorganic particles (b2) used in Embodiment A may be inorganic particles (b2-0) that are not modified with a functional group containing an epoxy group (hereinafter, simply referred to also as "inorganic particles (b2-0)"), or may be inorganic particles (b2-1) modified with a functional group containing an epoxy group (hereinafter, simply referred to also as "inorganic particles (b2-1)").

Examples of the inorganic particles (b2) in Embodiment A include the same specific examples as the specific examples listed above for the inorganic particles (a2). In addition, acceptable and preferred aspects of the polyfunctional monomer (b2) in Embodiment A are the same as the acceptable and preferred aspects listed for the polyfunctional monomer (a2).

Examples of the inorganic particles (b2-0) and the inorganic particles (b2-1) in Embodiment A include the same specific examples as the specific examples listed for the inorganic particles (a2-0) and the inorganic particles (a2-1). In addition, acceptable and preferred aspects of the inorganic particles (b2-0) and the inorganic particles (b2-1) in Embodiment A are the same as the acceptable and preferred aspect listed for the inorganic particles (a2-0) and the inorganic particles (a2-1).

When the inorganic particles (a2) are the inorganic particles (a2-0), the inorganic particles (b2) are preferably the inorganic particles (b2-0).

On the other hand, when the inorganic particles (a2) contained in the composition (A-1) contain the inorganic particles (a2-1) (in particular, in a case where the inorganic particles (a2) are the inorganic particles (a2-1)), the inorganic particles (b2) may be the inorganic particles (b2-0), the inorganic particles (b2-1), or a combination thereof.

However, when the inorganic particles (b2) contain both the inorganic particles (b2-0) and the inorganic particles (b2-1), a content mass of the inorganic particles (b2-1) in the composition (B-1) is preferably larger than the content mass of the inorganic particles (b2-0).

In Embodiment A, the content mass of the inorganic particles (b2) with respect to the total mass of the buffer layer (B) is 30% by mass or more.

This can improve the scratch resistance of the obtained laminated body.

From the same viewpoint as described above, the content mass of the inorganic particles (b2) with respect to the total mass of the buffer layer (B) is preferably from 40% by mass to 70% by mass, and more preferably from 41.5% by mass to 65% by mass.

When the inorganic particles (b2) contain both the inorganic particles (b2-0) and the inorganic particles (b2-1), preferred ranges of proportions of the inorganic particles (b2-0) and the inorganic particles (b2-1) are the same as the preferred ranges of the proportions of the inorganic particles (a2-0) and the inorganic particles (a2-1) when the inorganic particles (a2) contain both the inorganic particles (a2-0) and the inorganic particles (a2-1).

In Embodiment A, the proportion of the content mass of the inorganic particles (b2) to the polyfunctional monomer (b1) for forming the buffer layer (B) is preferably from 0.9/1 to 2.2/1, and more preferably from 1.3/1 to 2.2/1 as a ratio of the content mass of the inorganic particles (b2) to the content mass of the polyfunctional monomer (b1) in the composition (B-1).

Here, since high scratch resistance is obtained for the obtained laminated body, the ratio of the content mass of the inorganic particles (b2) to the content mass of the polyfunctional monomer (b1) in the composition (B-1) is preferably large to some extent.

Also in a relationship with the composition (A-1), the ratio of the content mass of the inorganic particles (b2) to the content mass of the polyfunctional monomer (b1) in the composition (B-1) is preferably larger than the ratio of the content mass of the inorganic particles (a2) to the content mass of the polyfunctional monomer (a1) in the composition (A-1).

In the laminated body of Embodiment A, the content mass of the inorganic particles (b2) with respect to the total mass of the buffer layer (B) is preferably larger than the content mass of the inorganic particles (a2) with respect to the storage layer (A).

In the laminated body of Embodiment A, the content mass of the inorganic particles (a2) with respect to the storage layer (A) is preferably from 30% by mass to 60% by mass, and the content mass of the inorganic particles (b2) with respect to the total mass of the buffer layer (B) is preferably from 40% by mass to 70% by mass.

<Surfactant (b3)>

The composition (B-1) in Embodiment A may contain a surfactant (b3).

Examples of the surfactant (b3) in Embodiment A include the same specific examples as those listed for the surfactant (a3). In addition, acceptable and preferred aspects of the surfactant (b3) in Embodiment A are the same as the acceptable and preferred aspects listed for the surfactant (a3).

Since the surfactant (b3) is not an essential component in the composition (B-1), the composition (B-1) need not contain a surfactant.

In the laminated body of Embodiment A, the content mass of the surfactant (a3) with respect to the total mass of the storage layer (A) is preferably larger than a content mass of the surfactant (b3) with respect to the total mass of the buffer layer (B).

As a result, the surfactant can be better moved from the storage layer (A) to the buffer layer (B), and the laminated body more effectively exhibits an antifogging effect.

From the above viewpoint, the ratio of the content mass of the surfactant (b3) with respect to the total mass of the buffer layer (B) to the content mass of the surfactant (a3) with respect to the total mass of the storage layer (A) (also referred to as "(b3)/(a3) ratio") is preferably from 0/10 to 8/10, more preferably from 0/10 to 5/10, and still more preferably from 0/10 to 3/10.

When the composition (B-1) contains the surfactant (b3), the content mass of the surfactant (b3) with respect to the total mass of the buffer layer (B) is preferably from more than 0% by mass to less than 1.0% by mass, and more preferably from 0.01% by mass to 0.8% by mass.

In the laminated body of Embodiment A, it is preferable that the content mass of the surfactant (a3) with respect to the total mass of the storage layer (A) is from 1.0% by mass to 5.0% by mass, and that the buffer layer (B) contains no surfactant, or that the content mass of the surfactant (b3) with respect to the total mass of the buffer layer (B) is from more than 0% by mass to less than 1.0% by mass.

<Any Other Surfactant>

The composition (B-1) used in Embodiment A can further contain any other surfactant that does not correspond to the surfactant (b3) (hereinafter, "any other surfactant") for imparting leveling property to an applied film or improving surface hydrophilicity thereof regardless of the presence or absence of the surfactant (b3).

Examples of the "any other surfactant" in the composition (B-1) include the same specific examples as those listed as the "any other surfactant" in the composition (A-1). In addition, the acceptable and preferred aspects of the "any other surfactant" in the composition (B-1) are the same as the acceptable and preferred aspects listed for the "any other surfactant" in the composition (A-1), and the same applies to the preferred content mass.

<Polymerization Initiator>

The composition (B-1) preferably contains a polymerization initiator.

Examples of the polymerization initiator in the composition (B-1) include the same specific examples as those listed as the polymerization initiator in the composition (A-1). In addition, the acceptable and preferred aspects of the polymerization initiator in the composition (B-1) in Embodiment A are the same as the acceptable and preferred aspects listed as the polymerization initiator in the composition (A-1).

In the laminated body of Embodiment A, it is preferable that each of the composition (A-1) and the composition (B-1) independently contain at least one of a thermal polymerization initiator and a photopolymerization initiator as the polymerization initiator.

In the laminated body of Embodiment A, it is preferable that each of the composition (A-1) and the composition (B-1) independently contain silica particles and contain an aluminum chelator and a thermal acid generator as the thermal polymerization initiator.

This can improve the scratch resistance of the laminated body.

From the same viewpoint as described above, the silica particles are preferably silica particles that are not modified with a functional group including an epoxy group.

<Light Stabilizer>

The composition (B-1) used in Embodiment A preferably further contains a light stabilizer.

Examples of the light stabilizer that can be used in Embodiment A include an ultraviolet absorber and a hindered amine light stabilizer.

The ultraviolet absorber is not particularly limited, and various ultraviolet absorbers such as a benzotriazole-based ultraviolet absorber, a triazine-based ultraviolet absorber, a benzophenone-based ultraviolet absorber, a benzoate-based ultraviolet absorber, a propanedioic acid ester-based ultraviolet absorber, and an oxanilide-based ultraviolet absorber can be used.

On the other hand, the hindered amine light stabilizer (abbreviated as HALS) is a generic term for compounds having a 2,2,6,6-tetramethylpiperidine skeleton. In addition, the HALSs are roughly classified into a low molecular weight HALS, a medium molecular weight HALS, a high molecular weight HALS, and a reactive HALS according to the molecular weight.

Examples of the hindered amine light stabilizer include ADK STAB LA-72 and Tinuvin 123.

A specific content mass of the light stabilizer in the buffer layer (B) is preferably 3% by mass or more with respect to the total mass of the buffer layer (B) so that a sufficient light resistance can be secured.

That is, the buffer layer (B) preferably contains the light stabilizer in an amount of 3% by mass or more with respect to the total mass of the buffer layer (B).

On the other hand, an upper limit of the content mass of the light stabilizer is not particularly limited as long as the light stabilizer is appropriately dispersed in the composition (B-1) and the antifogging properties are not impaired, but is preferably 4% by mass or less with respect to the total mass of the buffer layer (B).

In the laminated body of Embodiment A, it is preferable that the total content mass of the polyfunctional monomer (a1), the inorganic particles (a2), the surfactant (a3), and the polymerization initiator in the composition (A-1) is 95% by mass or more with respect to the total mass of the composition (A-1), and that the total content mass of the polyfunctional monomer (b1), the inorganic particles (b2), the surfactant (b3), and the polymerization initiator in the composition (B-1) is 95% by mass or more with respect to a total mass of the composition (B-1).

The composition (B-1) may contain a solvent.

Specific examples of the solvent contained in the composition (B-1) are the same as the specific examples of the solvent contained in the composition (A-1).

Preferred aspects of the solvent contained in the composition (B-1) are the same as the preferred aspects of the solvent contained in the composition (A-1).

<Configuration of Buffer Layer (B)>

In Embodiment A, the buffer layer (B) can be obtained by curing the composition (B-1) containing the polyfunctional monomer (b1), the inorganic particles (b2), and, optionally, the surfactant (b3). That is, the buffer layer (B) is a cured product of the composition (B-1).

Examples of the configuration of the buffer layer (B) include the same aspects as the aspects listed as the configuration of the storage layer (A). In addition, acceptable and preferred aspects of the configuration of the buffer layer (B) in Embodiment A are the same as the acceptable and preferred aspects listed as the configuration of the storage layer (A).

<Substrate>

Examples of the substrate used in the laminated body of Embodiment A include inorganic substrates made of inorganic materials such as glass, silica, metals, and metal oxides; plastic substrate including poly(meth)acrylates such as polymethyl methacrylate (PMMA), polyurethane, polythiourethane, polycarbonate, polyallyl carbonate (e.g., allyl diglycol carbonate (ADC)), polyethylene terephthalate, polyacetyl cellulose (TAC), acrylonitrile-butadiene-styrene copolymer (ABS), polyethylene, polypropylene, polystyrene, epoxy resin, vinyl chloride resin, silicone resin, and the like; paper substrates; pulp substrates; and organic inorganic substrates such as SMC and BMC in which an unsaturated polyester resin, a filler such as calcium carbonate, glass fibers, and the like are combined.

Further, a laminated substrate including the above-described substrate and a paint cured product layer can also be exemplified.

Among the above, the substrate is preferably a plastic substrate.

Among the above, the substrate preferably contains polythiourethane, polycarbonate, or polyallyl carbonate, and more preferably contains polythiourethane or polycarbonate, from the viewpoint of unnecessity for primer treatment or the like.

Examples of the shape of the substrate include a plate shape and a lens shape.

As the substrate, a lens-shaped plastic substrate (that is, a plastic lens) is preferable.

In addition, the surface of the substrate can be subjected to a physical or chemical treatment such as corona treatment, ozone treatment, low-temperature plasma treatment using oxygen gas, nitrogen gas, or the like, glow discharge treatment, oxidation treatment using a chemical or the like, or flame treatment, if necessary, for the purpose of activating the surface of the substrate. In addition, instead of or in addition to the above treatment, primer treatment, undercoat treatment, anchor coat treatment, or the like may be performed.

Examples of a coating agent usable for the primer treatment, the undercoat treatment, or the anchor coating treatment can include a coating agent containing, as a main component, a resin such as a polyester-based resin, a polyamide-based resin, a polyurethane-based resin, an epoxy resin, a phenol-based resin, a (meth)acrylic resin, a polyvinyl acetate-based resin, a polyolefin-based resin such as polyethylene or polypropylene or a copolymer or a modified resin thereof, or a cellulose-based resin. The coating agent used here may be a conventionally known coating agent usually used in the field to which Embodiment A belongs, and the coating agent can also be applied by a known coating method. An amount of the coating agent applied to the substrate is preferably from 0.5 µm to 10 µm in a dry state.

<Configuration of Laminated Body>

As described above, the laminated body according to Embodiment A includes the substrate, the storage layer (A), and the buffer layer (B) disposed in this order.

Each of the storage layer (A) and the buffer layer (B) included in the laminated body according to Embodiment A may have only one layer or two or more layers, and the storage layer (A) and the buffer layer (B) are preferably in direct contact with each other.

In the laminated body of Embodiment A, a ratio (film thickness ratio) of a thickness of the storage layer (A) to a thickness of the buffer layer (B) is preferably a certain value or more from the viewpoint of securing sufficiently high antifogging properties and hydrophilicity of the laminated body after water washing.

Specifically, the film thickness ratio is preferably 1.3 or more, more preferably 1.5 or more, and still more preferably 1.7 or more.

On the other hand, an upper limit of the film thickness ratio is not particularly limited as long as Embodiment A can be appropriately implemented in practical use, but is preferably 15 or less, more preferably 5 or less, and still more preferably 3.5 or less.

In the laminated body of Embodiment A, for example, from the viewpoint of favorably maintaining high antifogging properties and high hydrophilicity even after washing the laminated body with water, the ratio of the thickness of the storage layer (A) to the thickness of the buffer layer (B) is preferably in a range of from 1.3 to 15, more preferably in a range of from 1.5 to 5, and still more preferably in a range of from 1.7 to 3.5.

In one of preferred aspects of Embodiment A, the laminated body includes only the substrate, the storage layer (A), and the buffer layer (B). However, the laminated body of Embodiment A is not limited to those of the aspects, and may further include, in addition to the substrate, the storage layer (A), and the buffer layer (B), any other layer that is not the substrate, the storage layer (A), or the buffer layer (B).

<Any Other Component>

In addition to the substrate, the storage layer (A), and the buffer layer (B), the laminated body of Embodiment A may further include any other layer that is not the substrate, the storage layer (A), or the buffer layer (B) (hereinafter, "any other layer").

Examples of such "any other layer" include a primer layer, a hard coat layer, and an adhesive layer. The primer layer is a layer made of an adhesive (primer), and may be adopted to improve adhesiveness between two layers located so as to sandwich the layer. The laminated body of Embodiment A can exhibit sufficient adhesiveness for a substrate containing polyallyl carbonate, polythiourethane or the like without providing a primer layer.

<Method of Manufacturing Laminated Body>

T method of manufacturing a laminated body in Embodiment A is not particularly limited.

Examples of the method of manufacturing a laminated body in Embodiment A include the following manufacture method A.

The manufacture method A includes:

a step (S1) of providing an applied material layer (A2) of a composition (A-1a) containing a polyfunctional monomer (a1) containing two or more epoxy groups, inorganic particles (a2), a surfactant (a3), and a solvent (a4) on at least one surface of a substrate;

a step (S2) of removing the solvent (a4) from the applied material layer (A2);

a step (S3) of curing the applied material layer (A2) to obtain a storage layer (A);

a step (S4) of providing an applied material layer (B2) of a composition (B-1a) containing a polyfunctional monomer (b1) containing two or more epoxy groups, inorganic particles (b2), a surfactant (b3), and a solvent (b4) on the storage layer (A) after the step (S3);

a step (S5) of removing the solvent (b4) from the applied material layer (B2); and a step (S6) of curing the applied material layer (B2) to obtain a buffer layer (B).

<Step (S1)>

In the manufacture method A, the step (S1) is a step of providing an applied material layer (A2) of a composition (A-1a) containing the polyfunctional monomer (a1), the inorganic particles (a2), and the surfactant (a3) on at least one surface of the substrate.

As the "polyfunctional monomer (a1)", the "inorganic particles (a2)", and the "surfactant (a3)", the "polyfunctional monomer (a1)", the "inorganic particles (a2)", and the "surfactant (a3)" described in the above section "Storage layer (A)" are respectively used, and the amount of each of the components blended can also be the amount described in the above section "Storage layer (A)". As the "substrate", the substrate described in the above section "Substrate" is used.

The "solvent (a4)" is not an essential component of the storage layer (A) per se and is therefore also not an essential component of the composition (A-1a).

However, in one aspect of Embodiment A, when the storage layer (A) is manufactured, a step of applying the composition (A-1a) is performed. Therefore, the solvent (a4) is used so that the composition (A-1a) is brought into a form suitable for application.

Here, in the present specification, the composition (A-1) containing the solvent (a4) will be referred to as "composition (A-1a)".

The composition (A-1a) can be obtained by mixing the polyfunctional monomer (a1), the inorganic particles (a2), the surfactant (a3), and, if necessary, the solvent (a4) and the like. At this time, the solvent (a4) may be added separately from the polyfunctional monomer (a1), the inorganic particles (a2), the surfactant (a3), and the like, or may be added together with one or more of the polyfunctional monomer (a1), the inorganic particles (a2), the surfactant (a3), and the like.

For example, when the inorganic particles (a2) are used in the form of a sol or a slurry, a solvent as a component of the sol or the slurry may be as a component of the solvent (a4). When the surfactant (a3) or the like is used in the form of a solution, a solvent as a component of the solution may be as a component of the solvent (a4).

In the composition (A-1a), a polymerization initiator may be added as appropriate in addition to the polyfunctional monomer (a1), the inorganic particles (a2), the surfactant (a3), and the solvent (a4) in preparation for the step (S3) which will be described later.

As the polymerization initiator, the above-listed polymerization initiators can be used.

For example, when the composition (A-1a) is composed of the polyfunctional monomer (a1), an inorganic particle sol composed of the inorganic particles (a2) and a first solvent, the surfactant (a3), the photopolymerization initiator, and a second solvent, the "total dry mass of the composition (A-1a)" refers to a total mass of the polyfunctional monomer (a1), the inorganic particles (a2), the first solvent, the surfactant (a3), and the photopolymerization initiator.

Application of the composition (A-1a) to the substrate can be performed as appropriate by a conventionally known method. Examples of such an application method include a spin coating method, a dip coating method, a spray coating method, a flow coating method, a brush coating method, a gravure coating method, a reverse roll coating method, a knife coating method, and a kiss coating method. By the application, an applied material layer (A2) of the composition (A-1a) is obtained.

Here, prior to the step (S1), an adhesive (primer) may be applied and disposed between the substrate and the storage layer (A) in order to improve adhesion, or the surface of the substrate may be subjected to a surface treatment such as plasma treatment, corona treatment, or polishing.

In addition, for the purpose of improving hardness, a hard coated material may be used as the substrate, or a hard coat layer may be disclosed on the substrate by a known method, and the storage layer (A) and the buffer layer (B) may be formed thereon.

Furthermore, for the purpose of imparting any other function, a substance other than the above ones may be disposed between the substrate and the storage layer (A).

Furthermore, for example, for the purpose of controlling surface energy of an outermost layer, the buffer layer (B) as the outermost layer may be subjected to a surface treatment, or a graft treatment may be performed with a compound or the like having reactivity with the buffer layer (B) as the outermost layer.

In any case, a precursor laminated body (PL1) having the substrate and the applied material layer (A2) is obtained by this step (S1). The precursor laminated body (PL1) is subjected to the step (S2) which will be described subsequently.

<Step (S2)>

When the composition (A-1a) contains the solvent (a4), the step (S2) of removing the solvent (a4) from the applied material layer (A2) obtained in the step (S1) may be performed.

As for the residual solvent after the application of the composition (A-1a) to the substrate and immediately before polymerization curing, if an amount of the residual solvent is large, adhesion to the substrate tends to be deteriorated.

Therefore, it tends to be preferable that the amount of the residual solvent in the composition (A-1a) is small. Therefore, prior to the polymerization curing, the solvent (a4) is removed from the applied material layer (A2).

The step (S2) may be performed by naturally drying the precursor laminated body (PL1) obtained in the step (S1) or by heating the precursor laminated body (PL1) obtained in the step (S1).

<Step (S3)>

The step (S3) is a step of curing the applied material layer (A2) to obtain a storage layer (A).

The applied material layer (A2) can be cured by radiation exposure or heating.

Here, when the composition (A-1a) is polymerized and cured by radiation exposure, for example, ultraviolet (UV) irradiation, an applied material layer containing a photopolymerization initiator may be used as the applied material layer (A2).

In this case, the above-described photopolymerization initiator will be added to the composition (A-1a) manufactured in the step (S1).

When the composition (A-1a) is polymerized using radiation, an energy ray having a wavelength region of from 0.0001 nm to 800 nm can be used as the radiation. The radiation is classified into α-rays, β-rays, γ-rays, X-rays, electron beams, ultraviolet rays, visible light, and the like, and can be selected as appropriate and used according to the components included in the composition (A-1a).

In the case of polymerization by heat, an applied material layer containing a thermal polymerization initiator such as a thermal acid generator may be used as the applied material layer (A2). In this case, the above-described thermal polymerization initiator will be added to the composition (A-1a) manufactured in the step (S1).

When the composition (A-1a) is polymerized by heat, heating is performed in a range of from room temperature to 150° C. A heating time in this case can be set as appropriate. The polymerization can also be performed in the air, but the polymerization is preferably performed in an inert gas atmosphere such as nitrogen since the polymerization time can be shortened.

By the radiation exposure or heating as described above, a polymerization reaction of the polyfunctional monomer (a1) or the like contained in the applied material layer (A2) proceeds, and the polyfunctional monomer (a1) or the like is converted into a corresponding polymer. As a result, the applied material layer (A2) will be converted into the storage layer (A) containing such a polymer.

In other words, by this step (S3), a precursor laminated body (PL3) having the substrate and the storage layer (A) is obtained. The precursor laminated body (PL3) is subjected to the step (S4) which will be described subsequently.

<Step (S4)>

The step (S4) is a step of providing an applied material layer (B2) of a composition (B-1a) containing the polyfunctional monomer (b1), the inorganic particles (b2), and a solvent (b4) on the storage layer (A) after the step (S3).

Here, as the "polyfunctional monomer (b1)" and the "inorganic particles (b2)", the "polyfunctional monomer (b1)" and the "inorganic particles (b2)" described in the above section "Buffer layer (B)" are used, respectively.

The composition (B-1a) may contain or need not contain the "surfactant (b3)" described in the above section "Buffer layer (B)".

However, when the composition (B-1a) contains the surfactant (b3), the content mass of the surfactant (b3) with respect to the total dry mass of the composition (B-1) is preferably smaller than the content mass of the surfactant (a3) with respect to the total dry mass of the composition (A-1a).

The composition (B-1a) may or may not contain one or more of the "any other surfactant" and "light stabilizer" described in the above section "Buffer layer (B)".

An amount of each of the "polyfunctional monomer (b1)", the "inorganic particles (b2)", and, if necessary, the "surfactant (b3)" blended can also be the amounts described in the above section "Buffer layer (B)".

The "solvent (b4)" is not an essential component of the buffer layer (B) per se and is therefore also not an essential component of the composition (B-1). However, in one aspect of Embodiment A, when the buffer layer (B) is manufactured, a step of applying the composition (B-1) is performed. Therefore, the solvent (b4) is used so that the composition (B-1) is brought into a form suitable for application. Here, in the present specification, the composition (B-1) containing the solvent (b4) will be referred to as "composition (B-1a)".

The kind of the solvent (b4) is not particularly limited, but the solvent (b4) is preferably a solvent in which the components of the composition (B-1a) that is cured to form the buffer layer (B) are not separated. Specific examples of such a solvent (b4) may include the same solvents as those listed above for the solvent (a4). The solvent (b4) may be the same as or different from the solvent (a4).

Here, the composition (B-1a) can be obtained by mixing the polyfunctional monomer (b1), the inorganic particles (b2), the solvent (b4), and the like. At this time, the solvent (b4) may be added separately from the polyfunctional monomer (b1), the inorganic particles (b2), and the like, or may be added together with one or more of the polyfunctional monomer (b1), the inorganic particles (b2), and the like.

For example, when the inorganic particles (b2) are used in the form of a sol or a slurry, a solvent as a component of the sol or the slurry may be as a component of the solvent (b4). When the surfactant (b3) or the like is used in the form of a solution in the composition (B-1a), a solvent as a component of the solution may be as a component of the solvent (b4).

In addition, in the composition (B-1a), a conventionally known photopolymerization initiator or thermal polymerization initiator may be added as appropriate in addition to the polyfunctional monomer (b1), the inorganic particles (b2), the solvent (b4), and the like in preparation for the step (S6) which will be described later.

The photopolymerization initiator and the thermal polymerization initiator that can be added to the composition (B-1a) can be the same as the photopolymerization initiator and the thermal polymerization initiator that can be added to the composition (A-1a), respectively.

Amounts of the photopolymerization initiator, a photopolymerization accelerator, and the thermal polymerization initiator used are preferably from 1% by mass to 10% by mass, and more preferably from 3% by mass to 6% by mass, with respect to the total dry mass of the composition (B-1a).

When the buffer layer (B) is formed by application, the thickness of the buffer layer (B) can be adjusted by adjusting the amount of the solvent (b4) contained in the composition (B-1a).

The total dry mass of the composition (B-1a) per 100 parts by mass of the composition (B-1a) is preferably 35 parts by mass or more, and more preferably 37.5 parts by mass or more, so that the resulting buffer layer (B) can have a thickness necessary for having a sufficient strength and the like.

On the other hand, the total dry mass of the composition (B-1a) per 100 parts by mass of the composition (B-1a) is less than 100 parts by mass, and is preferably 50 parts by mass or less so as to obtain fluidity required for application.

For example, when the composition (B-1a) is composed of the polyfunctional monomer (b1), an inorganic particle sol composed of the inorganic particles (b2) and a first solvent, a dispersion liquid composed of the surfactant (b3) and a second solvent, a dispersion liquid composed of any other surfactant as described above and a third solvent, the light stabilizer, the photopolymerization initiator, and a fifth solvent, the total dry mass of the composition (B-1a) refers to a total mass of the polyfunctional monomer (b1), the inorganic particles (b2), the surfactant (b3), any other surfactant as described above, the light stabilizer, and the photopolymerization initiator.

The application of the composition (B-1a) to the storage layer (A) can be performed in the same manner as the application of the composition (A-1a) described for the above step (S1). By this step (S4), a precursor laminated body (PL4) having the substrate, the storage layer (A) and the applied material layer (B2) disposed in this order is obtained. The precursor laminated body (PL4) is subjected to the step (S5) which will be described subsequently.

<Step (S5)>

The step (S5) is a step of removing the solvent (b4) from the applied material layer (B2) obtained in the step (S4).

Similarly to the step (S2), the step (S5) may be performed by naturally drying the precursor laminated body (PL4) obtained in the step (S4) or by heating the precursor laminated body (PL4) obtained in the step (S4).

However, in this step (S5), the precursor laminated body (PL4) is preferably heated at from 50° C. to 90° C., that is, the step (S5) is preferably performed under heating at from 50° C. to 90° C., since a laminated body having a sufficiently high hardness can be obtained after the step (S6) even when the amount of the inorganic particles (b2) with respect to the polyfunctional monomer (b1) is small. This is presumably because the heating makes the crosslinked state denser during curing in the subsequent step (S6).

In addition, this heating is advantageously performed since the degree of crosslinking of the buffer layer (B) obtained in the form of the buffer layer (B) after the step (S6) can be further increased even in a situation where the content mass of the polyfunctional monomer (b1) with respect to the total dry mass of the composition (B-1) is smaller than the content mass of the polyfunctional monomer (a1) with respect to the total dry mass of the composition (A-1a).

A heating time in the case of performing the heating in this step (S5) is preferably from 3 minutes to 20 minutes.

<Step (S6)>

The step (S6) is a step of curing the applied material layer (B2) to obtain a buffer layer (B).

Here, when the composition (B-1a) is polymerized and cured by radiation exposure, for example, ultraviolet (UV) irradiation, an applied material layer containing a photopolymerization initiator may be used as the applied material layer (B2). In this case, the above-described photopolymerization initiator will be added to the composition (B-1a) manufactured in the step (S4).

When the composition (B-1a) is polymerized using radiation, wavelength and irradiation time of the radiation can be the same as those in the step (S4). In the case of polymerization by heat, an applied material layer containing a thermal polymerization initiator such as a thermal acid generator may be used as the applied material layer (B2).

In this case, the above-described thermal polymerization initiator will be added to the composition (B-1a) manufactured in the step (S4). When the composition (B-1a) is polymerized by heat, a heating temperature and a heating time can be the same as those in the step (S4).

By the radiation exposure or heating as described above, a polymerization reaction of the polyfunctional monomer (b1) or the like contained in the applied material layer (B2) proceeds, and the polyfunctional monomer (b1) or the like is converted into a corresponding polymer. As a result, the applied material layer (B2) will be converted into the buffer layer (B) containing such a polymer. In other words, by this step (S6), a laminated body having the substrate, the storage layer (A), and the buffer layer (B) disposed in this order is obtained.

The laminated body of Embodiment A can be obtained through the above steps (S1) to (S6).

The step (S2) and step (S3) may be performed simultaneously, or the step (S3) may be performed after the step (S2).

The step (S5) and step (S6) may be performed simultaneously, or the step (S6) may be performed after the step (S5).

As described above, when the storage layer (A) is formed by application, the thickness of the storage layer (A) can be adjusted by adjusting the amount of the solvent (a4) contained in the composition (A-1a).

From the above viewpoint, for example, in the method of manufacturing a laminated body of Embodiment A, the total dry mass of the composition (A-1a) per 100 parts by mass of the composition (A-1a) may be from 46 parts by mass to less than 100 parts by mass, or may be from 55 parts by mass to 65 parts by mass.

The laminated body obtained in Embodiment A and laminated bodies including the laminated body can be suitably used as an antifogging material, an antifouling material, a fast-drying material, a dew condensation preventing material, an antistatic material, and the like.

Such a laminated body of Embodiment A can be applied to various intended uses including optical articles such as optical films, optical disks, optical lenses, spectacle lenses, spectacles, sunglasses, goggles, helmet shields, head lamps, tail lamps, and window glasses of vehicles and buildings, and materials thereof <Antifogging Film Forming Composition>

The antifogging film forming composition of Embodiment A contains: a polyfunctional monomer (x1) containing two or more epoxy groups; inorganic particles (x2); and a surfactant (x3). A content mass of the inorganic particles (x2) with respect to a total dry mass of the antifogging film forming composition is 30% by mass or more. The polyfunctional monomer (x1) contains a polyfunctional monomer (x1-1) having a molecular weight per epoxy group in one molecule of 200 g/mol or more.

According to the antifogging film forming composition of Embodiment A, an antifogging film obtained by curing the antifogging film forming composition can be obtained.

In the antifogging film forming composition, the polyfunctional monomer (x1) containing two or more epoxy groups, the inorganic particles (x2), and the surfactant (x3) can be the polyfunctional monomer (a1) or the polyfunctional monomer (b1), the inorganic particles (a2) or the inorganic particles (b2), and the surfactant (a3) or the surfactant (b3).

<Set of Antifogging Film Forming Compositions>
The set of antifogging film forming compositions of Embodiment A includes:
an antifogging film forming composition A containing a polyfunctional monomer (x1A) containing two or more epoxy groups, inorganic particles (x2A), and a surfactant (x3A); and
an antifogging film forming composition B containing a polyfunctional monomer (x1B) containing two or more epoxy groups, inorganic particles (x2B), and a surfactant (x3B).

In the composition A, a content mass of the inorganic particles (x2A) with respect to a total dry mass of the antifogging film forming composition A is 30% by mass or more, and
the polyfunctional monomer (x1A) contains a polyfunctional monomer (x1-1A) having a molecular weight per epoxy group in one molecule of 200 g/mol or more.

In the composition B, a content mass of the inorganic particles (x2B) with respect to a total dry mass of the antifogging film forming composition B is 30% by mass or more, and
the polyfunctional monomer (x1B) contains a polyfunctional monomer (x1-1B) having a molecular weight per epoxy group in one molecule of 200 g/mol or more.

A content mass of the inorganic particles (x2B) with respect to the total dry mass of the antifogging film forming composition B is larger than a content mass of the inorganic particles (x2A) with respect to the total dry mass of the antifogging film forming composition A.

According to the set of antifogging film forming compositions of Embodiment A, an antifogging film having a favorable mechanical strength and excellent antifogging properties can be obtained. That is, according to the set of antifogging film forming compositions of Embodiment A, a laminated body having a favorable mechanical strength and excellent antifogging properties can be obtained.

In the set of antifogging film forming compositions of Embodiment A, for example, the polyfunctional monomer (a1), the inorganic particles (a2), and the surfactant (a3) described above can be used as the polyfunctional monomer (x1A), the inorganic particles (x2A), and the surfactant (x3A), and
the polyfunctional monomer (b1), the inorganic particles (b2), and the surfactant (b3) described above can be used as the polyfunctional monomer (x1B), the inorganic particles (x2B), and the surfactant (x3B).

Thus, the set of antifogging film forming compositions of Embodiment A can be used to manufacture the laminated body of Embodiment A having a favorable mechanical strength and excellent antifogging properties.

Embodiment A also includes the following aspects.

<1> A laminated body including: a substrate; a storage layer (A); and a buffer layer (B) disposed in this order, wherein the storage layer (A) is formed of a cured product of a composition (A-1) containing: a polyfunctional monomer (a1) containing two or more epoxy groups; inorganic particles (a2); and a surfactant (a3), the buffer layer (B) is formed of a cured product of a composition (B-1) containing: a polyfunctional monomer (b1) containing two or more epoxy groups; and inorganic particles (b2), a content mass of the inorganic particles (a2) with respect to a total mass of the storage layer (A) is 30% by mass or more, and a content mass of the inorganic particles (b2) with respect to a total mass of the buffer layer (B) is 30% by mass or more, the polyfunctional monomer (a1) contains a polyfunctional monomer (a1-1) having a molecular weight per epoxy group in one molecule of 200 g/mol or more, and the polyfunctional monomer (b1) contains a polyfunctional monomer (b1-1) having a molecular weight per epoxy group in one molecule of 200 g/mol or more.

<2> The laminated body according to <1>, wherein the content mass of the inorganic particles (b2) with respect to the total mass of the buffer layer (B) is larger than the content mass of the inorganic particles (a2) with respect to the total mass of the storage layer (A).

<3> The laminated body according to <1> or <2>, wherein each of the polyfunctional monomer (a1-1) and the polyfunctional monomer (b1-1) independently have an oxyalkylene structure.

<4> The laminated body according to any one of <1> to <3>, wherein each of the polyfunctional monomer (a1-1) and the polyfunctional monomer (b1-1) independently have a molecular weight of 500 g/mol or less per epoxy group in one molecule.

<5> The laminated body according to any one of <1> to <4>, wherein the polyfunctional monomer (a1) contains a polyfunctional monomer (a1-2) having a molecular weight of less than 200 g/mol per epoxy group in one molecule, and the polyfunctional monomer (b1) contains a polyfunctional monomer (b1-2) having a molecular weight of less than 200 g/mol per epoxy group in one molecule.

<6> The laminated body according to <5>, wherein each of the polyfunctional monomer (a1-2) and the polyfunctional monomer (b1-2) independently contain a compound represented by the following Formula (1):

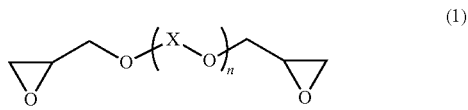

In Formula (1), X is an alkylene group having from 2 to 6 carbon atoms, and n is an integer from 1 to 5.
In Formula (1), when n is an integer from 2 to 5, a plurality of Xs may be the same or different.

<7> The laminated body according to any one of <1> to <6>, wherein the content mass of the inorganic particles (a2) with respect to the total mass of the storage layer (A) is from 30% by mass to 60% by mass, and the content mass of the inorganic particles (b2) with respect to the total mass of the buffer layer (B) is from 40% by mass to 70% by mass.

<8> The laminated body according to any one of <1> to <7>, wherein a content mass of the surfactant (a3) with respect to the total mass of the storage layer (A) is from 1.0% by mass to 5.0% by mass, and the buffer layer (B) contains no surfactant, or a content mass of the surfactant (b3) with respect to the total mass of the buffer layer (B) is from more than 0% by mass to less than 1.0% by mass.

<9> The laminated body according to any one of <1> to <8>, wherein the composition (A-1) further contains a polyfunctional monomer (a4) containing an oxetane ring, and the composition (B-1) further contains a polyfunctional monomer (b4) containing an oxetane ring.

<10> The laminated body according to any one of <1> to <9>, wherein each of the composition (A-1) and the composition (B-1) independently contain at least one of a thermal polymerization initiator and a photopolymerization initiator as a polymerization initiator.

<11> The laminated body according to any one of <1> to <10>, wherein each of the composition (A-1) and the composition (B-1) independently contain silica particles and contain an aluminum chelator and a thermal acid generator as the thermal polymerization initiator.

<12> The laminated body according to any one of <1> to <11>, wherein a ratio of a thickness of the storage layer (A) to a thickness of the buffer layer (B) is in a range of from 1.3 to 15.

<13> The laminated body according to any one of <1> to <12>, wherein the substrate is a plastic lens.

<14> The laminated body according to any one of <1> to <13>, wherein the substrate contains polythiourethane, polycarbonate, or polyallyl carbonate.

<15> The laminated body according to any one of <1> to <14>, wherein a total content mass of the polyfunctional monomer (a1), the inorganic particles (a2), the surfactant (a3), and the polymerization initiator in the composition (A-1) is 95% by mass or more with respect to a total mass of the composition (A-1), and a total content mass of the polyfunctional monomer (b1), the inorganic particles (b2), the surfactant (b3), and the polymerization initiator in the composition (B-1) is 95% by mass or more with respect to a total mass of the composition (B-1).

<16> A method of manufacturing a laminated body, including: a step (S1) of providing an applied material layer (A2) of a composition (A-1a) containing a polyfunctional monomer (a1) containing two or more epoxy groups, inorganic particles (a2), a surfactant (a3), and a solvent (a4) on at least one surface of a substrate; a step (S2) of removing the solvent (a4) from the applied material layer (A2); a step (S3) of curing the applied material layer (A2) to obtain a storage layer (A); a step (S4) of providing an applied material layer (B2) of a composition (B-1a) containing a polyfunctional monomer (b1) containing two or more epoxy groups, inorganic particles (b2), a surfactant (b3), and a solvent (b4) on the storage layer (A) after the step (S3); a step (S5) of removing the solvent (b4) from the applied material layer (B2); and a step (S6) of curing the applied material layer (B2) to obtain a buffer layer (B).

<17> The method of manufacturing a laminated body according to <16>, wherein a total dry mass of the composition (A-1) per 100 parts by mass of the composition (A-1) is from 46 parts by mass to less than 100 parts by mass.

<18> An antifogging film forming composition, containing: a polyfunctional monomer (x1) containing two or more epoxy groups; inorganic particles (x2); and a surfactant (x3), a content mass of the inorganic particles (x2) with respect to a total dry mass of the antifogging film forming composition is 30% by mass or more, and the polyfunctional monomer (x1) contains a polyfunctional monomer (x1-1) having a molecular weight per epoxy group in one molecule of 200 g/mol or more.

<19> An antifogging film obtained by curing the antifogging film forming composition according to <18>.

<20> A set of antifogging film forming compositions including:

an antifogging film forming composition A containing a polyfunctional monomer (x1A) containing two or more epoxy groups, inorganic particles (x2A), and a surfactant (x3A), in which a content mass of the inorganic particles (x2A) with respect to a total dry mass of the antifogging film forming composition A is 30% by mass or more, and the polyfunctional monomer (x1A) contains a polyfunctional monomer (x1-1A) having a molecular weight per epoxy group in one molecule of 200 g/mol or more; and an antifogging film forming composition B containing a polyfunctional monomer (x1B) containing two or more epoxy groups, inorganic particles (x2B), and a surfactant (x3B), in which a content mass of the inorganic particles (x2B) with respect to a total dry mass of the antifogging film forming composition B is 30% by mass or more, and the polyfunctional monomer (x1B) contains a polyfunctional monomer (x1-1B) having a molecular weight per epoxy group in one molecule of 200 g/mol or more, wherein a content mass of the inorganic particles (x2B) with respect to the total dry mass of the antifogging film forming composition B is larger than a content mass of the inorganic particles (x2A) with respect to the total dry mass of the antifogging film forming composition A.

Embodiment B

[Method of Manufacturing Antifogging Laminated Body]

A method of manufacturing an antifogging laminated body of Embodiment B includes:

a preparation step of preparing a laminated body including a substrate and a storage layer (A), in which the storage layer (A) contains a resin (a100) which is at least one of an epoxy resin and an acrylic resin, inorganic particles (a2), and a nonionic surfactant (a300); and an application step of applying a liquid composition containing an ionic surfactant to a surface of the laminated body on a side where the storage layer (A) is disposed.

The method of manufacturing an antifogging laminated body of Embodiment B may include other steps, if necessary.

According to the method of manufacturing an antifogging laminated body of Embodiment B, an antifogging laminated body can be manufactured by a simple method.

The reason why such an effect is exhibited is considered to be as follows: by applying a liquid composition containing an ionic surfactant to the surface of the laminated body on the side where the storage layer (A) is disposed, the ionic surfactant once permeates into the storage layer (A), and the ionic surfactant having permeated thereinto gradually moves to the surface, so that the antifogging properties (that is, performance of suppressing fogging) of the surface are improved.

Here, the ionic surfactant is more likely to permeate into the storage layer (A) when given to the storage layer (A) as compared with the nonionic surfactant, and thus is considered to be suitable as a surfactant in the liquid composition to be applied in the application step.

Here, the surface of the laminated body on the side where the storage layer (A) is disposed means a surface of an outermost surface layer of the laminated body on the side where the storage layer (A) is disposed.

For example, the surface of the laminated body on the side where the storage layer (A) is disposed means: a surface of the storage layer (A) when the storage layer (A) is the outermost surface layer in the laminated body, and a surface of any other layer (for example, the buffer layer (B) which will be described later) when any other layer (for example, the buffer layer (B) which will be described later) is present, as the outermost surface layer in the laminated body, on the storage layer (A).

The method of manufacturing an antifogging laminated body of Embodiment B is not particularly limited as long as it includes the preparation step and the application step.

For example, the method of manufacturing an antifogging laminated body of Embodiment B may be:

a method of imparting antifogging properties to a laminated body having no antifogging properties by the application step;

a method of further improving the antifogging properties of the laminated body originally having antifogging properties by the application step; or a method of recovering the antifogging properties of the laminated body having reduced antifogging properties by the application step.

Hereinafter, each step of the method of manufacturing an antifogging laminated body of Embodiment B will be described.

<Preparation Step>

The preparation step is a step of preparing a laminated body including a substrate and a storage layer (A), in which the storage layer (A) contains a resin (a100) which is at least one of an epoxy resin and an acrylic resin, inorganic particles (a2), and a nonionic surfactant (a300).

The preparation step may be a step of simply preparing the laminated body manufactured in advance, or may be a step of manufacturing the laminated body.

Further, the preparation step may include:

preparing the laminated body; and releasing at least a part of the nonionic surfactant (a300) from the storage layer (A) in the prepared laminated body.

In this case, the antifogging properties of the laminated body, which are reduced due to the release of at least a part of the nonionic surfactant (a300), can be recovered by the application step which will be described later.

A method of releasing at least a part of the nonionic surfactant (a300) is not particularly limited.

The release of at least a part of the nonionic surfactant (a300) may be realized by:

simply allowing the laminated body to stand, bringing water into contact with the surface of the laminated body on the side where the storage layer (A) is disposed, or the like, whereby the nonionic surfactant (a300) is gradually released (hereinafter, also referred to as slowly released) from the storage layer (A).

(Substrate)

The laminated body prepared in the preparation step includes a substrate.

The substrate is not particularly limited.

Details of specific examples, preferred treatments, preferred aspects, and the like of the substrate in Embodiment B are the same as the details of specific examples, preferred treatments, preferred aspects, and the like of the substrate in Embodiment A.

Examples of the shape of the substrate include a plate shape, a film shape, and a lens shape.

As the substrate, a lens-shaped plastic substrate (that is, a plastic lens) is preferable.

(Storage Layer (A))

The laminated body prepared in the preparation step includes a storage layer (A).

The storage layer (A) contains a resin (a100) which is at least one of an epoxy resin and an acrylic resin, inorganic particles (a2), and a nonionic surfactant (a300).

—Resin (a100)—

The resin (a100) contained in the storage layer (A) may be at least one of an epoxy resin and an acrylic resin.

The resin (a100) contained in the storage layer (A) may be only one kind or two or more kinds.

A content of the resin (a100) with respect to the total mass of the storage layer (A) is preferably from 30% by mass to 70% by mass, and more preferably from 40% by mass to 60% by mass.

Here, the content of the resin (a100) with respect to the total mass of the storage layer (A) substantially corresponds to a content of a monomer for forming the resin (a100) (hereinafter, also referred to as "resin (a100)-forming monomer") with respect to a total solid content (that is, a total amount excluding the amount of the solvent) of a composition for forming the storage layer (A) (hereinafter, also referred to as "storage layer (A)-forming composition").

Examples of the resin (a100)-forming monomer include a polyfunctional epoxy monomer which will be described later and a polyfunctional (meth)acrylic monomer which will be described later.

—Epoxy Resin—

The epoxy resin which may be contained in the resin (a100) is preferably formed using a monomer containing two or more epoxy groups (hereinafter, also referred to as polyfunctional epoxy monomer).

The polyfunctional epoxy monomer forms a network structure serving as a basic skeleton of the storage layer (A) by polymerization. In the storage layer (A), a space in which the surfactant (that is, the nonionic surfactant (a300) and/or the ionic surfactant given in the application step) is stored is formed as a gap of the network structure.

A molecular weight of the polyfunctional epoxy monomer is preferably from 100 to 2000, and more preferably from 150 to 1500.

The polyfunctional epoxy monomer preferably contains a polyfunctional epoxy monomer (AE1) having a molecular weight per epoxy group in one molecule (hereinafter referred to also as epoxy equivalent) of 200 g/mol or more.

The polyfunctional epoxy monomer contains the polyfunctional epoxy monomer (AE1), thereby making it possible to further reduce a number of reaction points in the crosslinking reaction while ensuring the molecular weight required for layer formation. As a result, the storage layer (A) can easily retain moisture, and thus the antifogging properties of the laminated body can be further improved.

A preferred range of the epoxy equivalent of the polyfunctional epoxy monomer (AE1) in Embodiment B is similar to the preferred range of the epoxy equivalent of the polyfunctional monomer (a1-1) in Embodiment A.

The polyfunctional epoxy monomer (AE1) is preferably a bifunctional epoxy monomer.

The polyfunctional epoxy monomer (AE1) may include an alkanepolyol structure such as an alkanediol or an alkanetriol, and may also include an oxyalkylene structure such as a polyoxyalkylene glycol (for example, polyethylene glycol) or a compound obtained by adding a polyoxyalkylene to an alkane polyol.

Among these structures, the polyfunctional epoxy monomer (AE1) preferably has an oxyalkylene structure from the viewpoint of improving water absorbing properties to obtain more favorable antifogging properties.

Details of specific aspects, preferred specific aspects, and the like of the oxyalkylene structure in Embodiment B are the same as the details of specific aspects, preferred specific aspects, and the like of the oxyalkylene structure in Embodiment A.

The polyfunctional epoxy monomer (AE1) may further contain an aromatic ring, or may be an alicyclic compound.

Examples of the polyfunctional epoxy monomer (AE1) containing an aromatic ring include an ethylene oxide adduct of bisphenol.

A linker moiety (that is, a portion other than the epoxy group) in the polyfunctional epoxy monomer (AE1) is preferably a chain structure from the viewpoint of improving the antifogging properties.

A molecular weight of the polyfunctional epoxy monomer (AE1) is preferably from 300 to 2000, and more preferably from 300 to 1000.

As the polyfunctional epoxy monomer (AE1), a commercially available product may be used.

Examples of the commercially available product include DENACOL EX-841 (manufactured by Nagase ChemteX Corporation).

In addition to the polyfunctional epoxy monomer (AE1), the polyfunctional epoxy monomer may include a polyfunctional epoxy monomer (AE2) having an epoxy equivalent of less than 200 g/mol.

As a result, the number of reaction points in the crosslinking reaction can be increased, and thus the degree of crosslinking can be improved. As a result, the scratch resistance of the laminated body can be further improved.

The polyfunctional epoxy monomer (AE2) preferably contains a compound represented by the following formula (AE2-1).

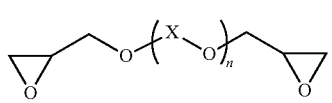

(AE2-1)

In Formula (AE2-1), X is an alkylene group having from 2 to 6 carbon atoms, and n is an integer from 1 to 5.

In Formula (AE2-1), when n is an integer from 2 to 5, a plurality of Xs may be the same or different.

Details of specific aspects, preferred specific aspects, and the like of Formula (AE2-1) in Embodiment B are the same as the details of specific aspects, preferred specific aspects, and the like of Formula (1) in Embodiment A.

A molecular weight of the polyfunctional epoxy monomer (AE2) is preferably from 100 to 2000, and more preferably from 150 to 1500.

As the polyfunctional epoxy monomer (AE2), a commercially available product may be used.

Examples of the commercially available product include DENACOL EX-313 and DENACOL EX-521 (both manufactured by Nagase ChemteX Corporation).

The polyfunctional epoxy monomer used in the formation of the epoxy resin in the resin (a100) may be only one kind or two or more kinds.

When the storage layer (A) containing an epoxy resin as the resin (a100) is formed, a content of the polyfunctional epoxy monomer with respect to a total amount of all monomers contained in the storage layer (A)-forming composition is preferably 70% by mass or more, and more preferably 75% by mass or more.

When the storage layer (A) containing an epoxy resin as the resin (a100) is formed, a total content of the polyfunctional epoxy monomer is preferably from 30% by mass to 70% by mass, and more preferably from 40% by mass to 60% by mass with respect to the total solid content of the storage layer (A)-forming composition (that is, the total amount excluding the amount of the solvent).

When the storage layer (A)-forming composition contains the polyfunctional epoxy monomer (AE1) and the polyfunctional epoxy monomer (AE2), a proportion of the polyfunctional epoxy monomer (AE1) to a total mass of the polyfunctional epoxy monomer (AE1) and the polyfunctional epoxy monomer (AE2) is preferably from 5% by mass to 50% by mass, and preferably from 10% by mass to 40% by mass.

The storage layer (A)-forming composition may further contain a polyfunctional monomer containing an oxetane ring.

Details of specific aspects, preferred specific aspects, commercially available products and the like of the polyfunctional monomer containing an oxetane ring in Embodiment B are the same as the details of specific aspects, preferred specific aspects, commercially available products and the like of the polyfunctional monomer containing an oxetane ring in Embodiment A.

—Acrylic Resin—

The acrylic resin which may be contained in the resin (a100) is preferably formed using a monomer containing two or more (meth)acryloyl groups (hereinafter, also referred to as polyfunctional (meth)acrylic monomer).

The polyfunctional (meth)acrylic monomer forms a network structure serving as a basic skeleton of the storage layer (A) by polymerization. In the storage layer (A), a space in which the surfactant (that is, the nonionic surfactant (a300) and/or the ionic surfactant given in the application step) is stored is formed as a gap of the network structure.

In Embodiment B, the (meth)acryloyl group means an acryloyl group or a methacryloyl group, and the (meth)acrylic monomer means an acrylic monomer or a methacrylic monomer.

A concept of the acrylic resin in Embodiment B includes not only a resin formed by polymerization of an acrylic monomer but also a resin formed by polymerization of a methacrylic monomer.

The polyfunctional (meth)acrylic monomer preferably contains two or more (meth)acryloyl groups and a linker moiety that fixes the two or more (meth)acryloyl groups in one molecule.

The polyfunctional (meth)acrylic monomer is preferably an ester of (meth)acrylic acid and a polyhydric alcohol having two or more hydroxyl groups.

Examples of the "polyhydric alcohol having two or more hydroxyl groups" include:
alkanepolyols such as alkanediol and alkanetriol; and
compounds having a polyoxyalkylene structure, such as a polyalkylene glycol (for example, polyethylene glycol or polypropylene glycol) and a compound obtained by adding a polyalkylene glycol to an alkane polyol.

The "polyhydric alcohol having two or more hydroxyl groups" may contain an aromatic ring and/or an aliphatic ring. Examples of the "polyhydric alcohol having two or more hydroxyl groups" containing an aromatic ring include an ethylene oxide adduct of bisphenol.

The "polyhydric alcohol having two or more hydroxyl groups" is preferably a compound having a polyoxyalkylene structure, and more preferably a diol having a polyoxyethylene structure.

Specific examples of the polyfunctional (meth)acrylic monomer include compounds represented by the following Formula (AA1) or the following Formula (AA2).

The polyfunctional (meth)acrylic monomer preferably contains a compound represented by the following Formula (AA1).

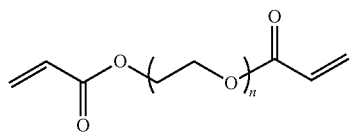

(AA1)

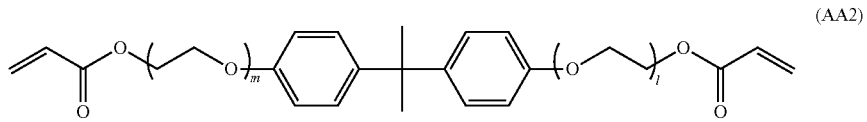

(AA2)

In Formula (AA1), n represents an integer from 1 to 30.

In Formula (AA2), l and m represent numbers such that l+m is an integer from 2 to 40.

Specific examples of the polyfunctional (meth)acrylic monomer include polyethylene glycol diacrylate and 2,2-bis[4-(acryloxy-polyethoxy)phenyl]-propane.

Examples of polyethylene glycol di(meth)acrylate include tetradecaethylene glycol di(meth)acrylate and tricosaethylene glycol di(meth)acrylate.

The polyfunctional (meth)acrylic monomer used in the formation of the acrylic resin in the resin (a100) may be only one kind or two or more kinds.

When the storage layer (A) containing an acrylic resin as the resin (a100) is formed, a content of the polyfunctional (meth)acrylic monomer with respect to a total amount of all monomers contained in the storage layer (A)-forming composition is preferably 70% by mass or more, and more preferably 75% by mass or more.

When the storage layer (A) containing an acrylic resin as the resin (a100) is formed, a total content of the polyfunctional (meth)acrylic monomer is preferably from 30% by mass to 70% by mass, and more preferably from 40% by mass to 60% by mass with respect to the total solid content of the storage layer (A)-forming composition (that is, the total amount excluding the amount of the solvent).

—Inorganic Particles (a2)—

The storage layer (A) contains at least one kind of inorganic particles (a2).

Thus, the storage layer (A) has excellent hardness and strength.

The inorganic particles (a2) may preferably be present inside the storage layer (A) so as to be incorporated into the network structure in the resin (a100).

The inorganic particles (a2) may be inorganic particles (a2-0) that are not modified with a functional group (hereinafter, simply referred to also as "inorganic particles (a2-0)"), or may be inorganic particles (a2-1) that are modified with a functional group (hereinafter, simply referred to also as "inorganic particles (a2-1)").

Details of definition, specific aspects, preferred specific aspects, particle size, commercially available products and the like of the inorganic particles (a2-0) in Embodiment B are the same as the details of definition, specific aspects, preferred specific aspects, particle size, commercially available products and the like of the inorganic particles (a2-0) in Embodiment A.

The inorganic particles (a2) may be inorganic particles (a2-1) modified with a functional group.

The inorganic particles (a2-1) are particles including the inorganic particles (a2-0) as basic particles whose surfaces are modified with a functional group.

The functional group preferably contains at least one of an epoxy group and a (meth)acryloyl group.

The inorganic particles (a2-1) are commercially available, and examples thereof include PGM-AC-2140Y and MEK-EC-2430Z (both manufactured by Nissan Chemical Corporation).

It is preferable that a content of the inorganic particles (a2) with respect to the total mass of the storage layer (A) is preferably 30% by mass or more. As a result, the scratch resistance of the obtained laminated body is further improved.

Details of a preferred range of the content of the inorganic particles (a2) with respect to the total mass of the storage layer (A) in Embodiment B are the same as the details of a preferred range of the content mass of the inorganic particles (a2) with respect to the total mass of the storage layer (A) in Embodiment A.

The content of the inorganic particles (a2) with respect to the total mass of the storage layer (A) substantially corresponds to a content of the inorganic particles (a2) with respect to the total solid content of the storage layer (A)-forming composition.

Hereinafter, the same applies to each component in the storage layer (A) and each component in the buffer layer (B).

In the storage layer (A)-forming composition, a proportion of the inorganic particles (a2) to the resin (a100)-forming monomer is preferably from 0.6 to 1.8, and more preferably from 0.8 to 1.6.

In the storage layer (A), a proportion of the inorganic particles (a2) to the resin (a100) is preferably from 0.6 to 1.8, and more preferably from 0.8 to 1.6.

—Nonionic Surfactant (a300)—

The storage layer (A) contains at least one kind of nonionic surfactant (a300).

The nonionic surfactant (a300) is a component that is slowly released (that is, gradually released) from the storage layer (A), moves to the surface of the laminated body on the side where the storage layer (A) is disposed, and exerts the antifogging properties of the laminated body.

In the method of manufacturing an antifogging laminated body according to Embodiment B, the effect of the nonionic surfactant (a300) originally contained in the storage layer (A) and the effect obtained by the ionic surfactant given into the storage layer (A) in the application step are combined to obtain an antifogging laminated body more excellent in antifogging properties.

The nonionic surfactant (a300) has an advantage of having less influence on the polymerization of the resin (a100)-forming monomer in the formation of the storage layer (A) as compared with the ionic surfactant.

As previously described, the nonionic surfactant (a300) in the storage layer (A) may be released from the storage layer (A). Therefore, at the time of the application step, a content of the nonionic surfactant (a300) with respect to the total mass of the storage layer (A) may be reduced as compared with that immediately after the formation of the storage layer (A). Even in this case, the antifogging properties of the laminated body can be recovered by giving the ionic surfactant in the application step.

In the laminated body, the content of the nonionic surfactant (a300) with respect to the total mass of the storage layer (A) is not particularly limited.

The content of the nonionic surfactant (a300) with respect to the total mass of the storage layer (A) may be, for example, from more than 0% by mass to 10% by mass, from more than 0% by mass to 5% by mass, from more than 0% by mass to 3% by mass, or from more than 0% by mass to 1% by mass.

A lower limit of the content of the nonionic surfactant (a300) with respect to the total mass of the storage layer (A) may be, for example, 0.1% by mass or 0.3% by mass.

As described above, the preparation step may include preparing a laminated body (for example, by allowing the laminated body to stand) and releasing at least a part of the nonionic surfactant (a300) from the storage layer (A) in the prepared laminated body.

In this case, the content of the nonionic surfactant (a300) with respect to the total mass of the storage layer (A) in a stage where at least a part of the nonionic surfactant (a300) is released (that is, a stage where the laminated body is subjected to the application step) may be from more than 0% by mass to 1% by mass, or may be from more than 0% by mass to 0.5% by mass.

In this case, the content of the nonionic surfactant (a300) with respect to the total mass of the storage layer (A) in a stage before the release of at least a part of the nonionic surfactant (a300) may be from 0.1% by mass to 10% by mass or less, from 0.3% by mass to 10% by mass, or from 1% by mass to 5% by mass.

The nonionic surfactant (a300) is preferably a compound having a polyoxyalkylene structure, and more preferably a compound containing a hydrocarbon group and having a polyoxyalkylene structure.

Examples of the hydrocarbon group include an alkyl group and an alkenyl group.

Examples of the compound containing a hydrocarbon group and having a polyoxyalkylene structure as the nonionic surfactant (a300) include:

polyoxyalkylene alkyl ethers such as polyoxyalkylene monoalkyl ethers, polyoxyalkylene alkenyl ethers such as polyoxyalkylene monoalkenyl ethers, and mixtures thereof.

Examples of the polyoxyalkylene alkyl ether include polyoxyethylene alkyl ethers (for example, polyoxyethylene isodecyl ether and polyoxyethylene lauryl ether).

The compound containing a hydrocarbon group and having a polyoxyalkylene structure as the nonionic surfactant (a300) may further contain an anionic hydrophilic group.

Examples of the compound containing an anionic hydrophilic group, among the nonionic surfactants (a300), include a polyoxyalkylene alkyl ether sulfate, a polyoxyalkylene alkenyl ether sulfate, and a mixture thereof.

As the nonionic surfactant (a300), a commercially available product may be used.

Examples of the commercially available product include NOIGEN LP-100 (polyoxyalkylene lauryl ether manufactured by DKS Co., Ltd.).

—Any Other Component—

The storage layer (A) may contain any other component than the above components.

As the component, the components of the storage layer (A)-forming composition described below can be referred to.

(Storage Layer (A)-Forming Composition and Method of Forming Storage Layer (A))

The storage layer (A)-forming composition can contain the resin (a100)-forming monomer (for example, a polyfunctional epoxy monomer or a polyfunctional (meth) acrylic monomer), the inorganic particles (a2), and the nonionic surfactant (a300).

The storage layer (A) in the laminated body can be formed by applying the storage layer (A)-forming composition onto a substrate and curing the applied storage layer (A)-forming composition.

Application of the storage layer (A)-forming composition onto the substrate can be performed as appropriate by a conventionally known method. Examples of an application method include a spin coating method, a dip coating method, a spray coating method, a flow coating method, a brush coating method, a gravure coating method, a reverse roll coating method, a knife coating method, and a kiss coating method.

In addition, prior to the application of the storage layer (A)-forming composition, any other layer (for example, a primer layer, a hard coat layer, or the like) may be formed on the substrate. In this case, the storage layer (A)-forming composition is applied onto a region of the substrate where any other layer is formed.

In addition, a surface of the substrate on a side where the storage layer (A)-forming composition is applied (in the case of forming any other layer, the layer is formed) may be subjected to a surface treatment such as a plasma treatment, a corona treatment, or a polishing treatment in advance.

The storage layer (A)-forming composition applied onto the substrate is cured by polymerizing the resin (a100)-forming monomer.

When the resin (a100)-forming monomer contains a polyfunctional epoxy monomer (that is, when the resin (a100)-forming monomer contains an epoxy resin), the resin (a100)-forming monomer is preferably polymerized at least through thermal polymerization.

When the resin (a100)-forming monomer contains a polyfunctional (meth)acrylic monomer (that is, when the resin (a100)-forming monomer contains an acrylic resin), the resin (a100)-forming monomer is preferably polymerized at least through photopolymerization.

In Embodiment B, the term "photo" in "photopolymerization" or the like means active energy rays such as ultraviolet rays and visible rays.

The thermal polymerization is performed, for example, by heating the storage layer (A)-forming composition applied onto the substrate, for example, in a range of from room temperature to 150° C. A heating time in this case can be set as appropriate.

The photopolymerization is performed, for example, by irradiating the storage layer (A)-forming composition applied onto the substrate with active energy rays.

As the active energy rays, active energy rays having a wavelength range of from 0.0001 nm to 800 nm can be used.

Examples of the active energy rays include α rays, β rays, γ rays, X-rays, electron rays, ultraviolet rays (UV), and visible light.

—Polymerization Initiator—

The storage layer (A)-forming composition preferably contains at least one kind of polymerization initiator.

As the polymerization initiator, at least one of a thermal polymerization initiator and a photopolymerization initiator is preferable.

When the resin (a100)-forming monomer contains a polyfunctional epoxy monomer (that is, when the resin (a100)-forming monomer contains an epoxy resin), the polymerization initiator preferably contains at least a thermal polymerization initiator.

When the resin (a100)-forming monomer contains a polyfunctional (meth)acrylic monomer (that is, when the resin (a100)-forming monomer contains an acrylic resin), the polymerization initiator preferably contains at least a photopolymerization initiator.

Details of specific aspects, preferred specific aspects, commercially available products, and the like of the thermal polymerization initiator in Embodiment B are the same as the details of specific aspects, preferred specific aspects, commercially available products, and the like of the thermal polymerization initiator in Embodiment A.

Examples of the photopolymerization initiator include a photoradical polymerization initiator, a photocationic polymerization initiator, and a photoanionic polymerization initiator.

Examples of the photoradical polymerization initiator include Omnirad 184 (manufactured by IGM Resins RV).

Examples of the photocationic polymerization initiator include San-Apro CP-210S (Sanyo Chemical Industries, Ltd.).

A content of the polymerization initiator with respect to the total solid content of the storage layer (A)-forming composition is preferably from 0.1% by mass to 10% by mass, and more preferably from 0.5% by mass to 5% by mass.

The same applies to a preferred range of the content of the polymerization initiator with respect to the total mass of the storage layer (A) to be formed.

—Solvent—

The storage layer (A)-forming composition may contain at least one kind of solvent.

Details of specific aspects, preferred specific aspects, and the like of the solvent in Embodiment B are the same as the details of specific aspects, preferred specific aspects, and the like of the solvent in Embodiment A.

(Buffer Layer (B))

The laminated body prepared in the preparation step may include the substrate, the storage layer (A), and the buffer layer (B) in contact with the storage layer (A) disposed in this order.

The buffer layer (B) contains a resin (b1) which is at least one of an epoxy resin and an acrylic resin and inorganic particles (b2).

The components contained in the buffer layer (B) are the same as the components contained in the storage layer (A) except that the buffer layer (B) is not limited to containing a nonionic surfactant, and the same applies to the preferred aspects (for example, kind and content) thereof.

For example, preferred aspects of the resin (b1) and the inorganic particles (b2) contained in the buffer layer (B) are the same as preferred aspects of the resin (a100) and the inorganic particles (a2) contained in the storage layer (A), respectively.

The buffer layer (B) may contain a nonionic surfactant (b3). In this case, preferred aspects of the nonionic surfactant (b3) contained in the buffer layer (B) are the same as the preferred aspects of the nonionic surfactant (a300) contained in the storage layer (A).

No matter whether the buffer layer (B) does not contain or contains the nonionic surfactant (b3), a proportion of a content of the nonionic surfactant (b3) to the total mass of the buffer layer (B) is preferably smaller than the proportion of the content of the nonionic surfactant (a300) to the total mass of the storage layer (A) (in particular, the proportion of the content of the nonionic surfactant (a300) to the total mass of the storage layer (A) at a stage before the content of the nonionic surfactant (a300) is reduced).

Thus, the movement of the nonionic surfactant (a300) from the storage layer (A) to the buffer layer (B) is further promoted, so that the antifogging properties in the laminated body are further improved.

From the above viewpoint, a ratio of [the proportion of the content of the nonionic surfactant (b3) to the total mass of the buffer layer (B) to the proportion of the content of the nonionic surfactant (a300) to the total mass of the storage layer (A)] is preferably from 0/10 to 8/10, more preferably from 0/10 to 5/10, and still more preferably from 0/10 to 3/10.

Specifically, a ratio of a film thickness of the storage layer (A) to a film thickness of the buffer layer (B) is preferably 1.3 or more, more preferably 1.5 or more, and still more preferably 1.7 or more.

Specifically, an upper limit of the ratio is preferably 15 or less, more preferably 5 or less, and still more preferably 3.5 or less.

(Any Other Layer)

The laminated body may further include any other layer in addition to the substrate, the storage layer (A), and the buffer layer (B).

Examples of the layer include a primer layer, a hard coat layer, and an adhesive layer.

<Application Step>

The application step is a step of applying a liquid composition containing an ionic surfactant to a surface of the laminated body prepared in the preparation step on a side where the storage layer (A) is disposed.

Through such an application step, the ionic surfactant permeates into the storage layer (A) from the surface of the laminated body.

The ionic surfactant that has reached the storage layer (A) is slowly released with the elapse of time together with the nonionic surfactant originally contained, so that excellent antifogging properties on the surface of the laminated body are exhibited.

That is, an antifogging laminated body having excellent antifogging properties is obtained by the application step.

A method of applying the liquid composition is not particularly limited, and, for example, the examples of the application method used when applying the storage layer (A)-forming composition to the substrate can be appropriately referred to.

In the application step, after the application of the liquid composition, the liquid composition may be left to stand without wiping to allow the ionic surfactant to permeate into the storage layer (A). A leaving time is, for example, 30 seconds or more, more preferably 1 minute or more, still more preferably 5 minutes or more, and still more preferably 10 minutes or more.

—Liquid Composition—

The liquid composition contains at least one kind of ionic surfactant.

The ionic surfactant may be an anionic surfactant or a cationic surfactant, but preferably contains an anionic surfactant.

As for a specific example of the ionic surfactant (in particular, an anionic surfactant), for example, paragraph [0018] of WO 2016/111035 can be referred to.

The ionic surfactant preferably contains at least one kind selected from the group consisting of fatty acid salts, alkyl ether carboxylates, alkane sulfonates, α-olefin sulfonates, α-sulfomethyl ester salts, alkyl benzene sulfonates, alkyl succinates, alkyl sulfate ester salts, and alkyl ether sulfate ester salts.

Examples of the alkyl ether sulfate ester salts include sodium 2-ethylhexyl sulfate, sodium lauryl sulfate, sodium alkyl sulfate, sodium polyoxyethylene lauryl ether sulfate, and sodium polyoxyethylene alkyl ether sulfate (AES).

Examples of the alkylbenzene sulfonates include linear sodium alkylbenzene sulfonate (LAS).

A content of the ionic surfactant with respect to a total amount of the liquid composition is preferably from 1% by mass to 40% by mass, more preferably from 5% by mass to 35% by mass, and still more preferably from 10% by mass to 30% by mass.

The liquid composition preferably contains water as the solvent.

A content of water with respect to the total amount of the liquid composition is preferably 50% by mass or more, more preferably 60% by mass or more, and still more preferably 70% by mass or more.

The liquid composition may contain any other component than the above components.

From the viewpoint of further suppressing scratches on the surface of the laminated body, it is preferable that the liquid composition does not contain an abrasive (for example, inorganic fillers such as alumina and silica), or that, when the liquid composition contains an abrasive, a content of the abrasive is 10 ppm by mass or less with respect to the total amount of the liquid composition.

[Antifogging Laminated Body]

The antifogging laminated body of Embodiment B includes:

a substrate and a storage layer (AX).

The storage layer (AX) contains a resin (a100) which is at least one of an epoxy resin and an acrylic resin, inorganic particles (a2), a nonionic surfactant (a300), and an ionic surfactant.

The antifogging laminated body of Embodiment B includes a storage layer (AX) containing a nonionic surfactant (a300) and an ionic surfactant. As a result, an effect that the nonionic surfactant (a300) and the ionic surfactant are slowly released from the storage layer (AX) is obtained, and thus the antifogging properties are excellent.

The substrate in the antifogging laminated body of Embodiment B is the same as the substrate in the laminated body prepared in the preparation step.

The storage layer (AX) in the antifogging laminated body of Embodiment B is the same as the storage layer (A) in the laminated body prepared in the preparation step, except that an ionic surfactant is added as an essential component.

The antifogging laminated body of Embodiment B may have the same features as those of the laminated body prepared in the preparation step, such as the buffer layer (B).

The antifogging laminated body of Embodiment B is preferably manufactured by the method of manufacturing an antifogging laminated body of Embodiment B described above.

In this case, the ionic surfactant is given into the storage layer (A) in the laminated body prepared in the preparation step in the application step. This converts the storage layer (A) into the storage layer (AX). That is, in this case, a layer obtained by giving the ionic surfactant to the storage layer (A) is the storage layer (AX).

[Liquid Composition]

A liquid composition of Embodiment B is:

a liquid composition which is applied to a surface of a laminated body on a side where a storage layer (A) is disposed, wherein the laminated body includes: a substrate and the storage layer (A), and wherein the storage layer (A) contains: a resin (a100) which is at least one of an epoxy resin and an acrylic resin, inorganic particles (a2), and a nonionic surfactant (a300), the liquid composition containing an ionic surfactant.

By applying the liquid composition of Embodiment B to the surface of the laminated body on which the storage layer (A) is disposed, the antifogging properties of the surface of the laminated body are improved as described above.

The liquid composition of Embodiment B is the same as the liquid composition used in the application step described above, and the same applies to the preferred aspects thereof.

Embodiment B also includes the following aspects.

<1> A method of manufacturing an antifogging laminated body, the method including:

a preparation step of preparing a laminated body including a substrate and a storage layer (A), in which the storage layer (A) contains a resin (a100) which is at least one of an epoxy resin and an acrylic resin, inorganic particles (a2), and a nonionic surfactant (a300); and an application step of applying a liquid composition containing an ionic surfactant to a surface of the laminated body on a side where the storage layer (A) is disposed.

<2> the method of manufacturing an antifogging laminated body according to <1>, wherein the laminated body includes: the substrate, the storage layer (A), and a buffer layer (B) in contact with the storage layer (A) disposed in this order, and wherein the buffer layer (B) contains: a resin (b1) which is at least one of an epoxy resin and an acrylic resin, and inorganic particles (b2).

<3> The method of manufacturing an antifogging laminated body according to <1> or <2>, wherein the ionic surfactant contains at least one kind selected from the group consisting of fatty acid salts, alkyl ether carboxylates, alkane sulfonates, α-olefin sulfonates, α-sulfomethyl ester salts, alkyl benzene sulfonates, alkyl succinates, alkyl sulfate ester salts, and alkyl ether sulfate ester salts.

<4> The method of manufacturing an antifogging laminated body according to any one of <1> to <3>, wherein the liquid composition does not contain an abrasive, or, when the liquid composition contains an abrasive, a content of the abrasive is 10 ppm by mass or less with respect to a total amount of the liquid composition.

<5> The method of manufacturing an antifogging laminated body according to any one of <1> to <4>, wherein the nonionic surfactant (a300) is a compound having a polyoxyalkylene structure.

<6> The method of manufacturing an antifogging laminated body according to any one of <1> to <5>, wherein the preparation step includes preparing the laminated body and releasing at least a part of the nonionic surfactant (a300) from the storage layer (A) in the prepared laminated body, and wherein the application step is a step of applying the liquid composition to a surface of the laminated body on a side where the storage layer (A) is disposed, from which at least a part of the nonionic surfactant (a300) has been released.

<7> An antifogging laminated body including:
a substrate and a storage layer (AX),
wherein the storage layer (AX) contains a resin (a100) which is at least one of an epoxy resin and an acrylic resin, inorganic particles (a2), a nonionic surfactant (a300), and an ionic surfactant.

<8> A liquid composition which is applied to a surface of a laminated body on a side where a storage layer (A) is disposed,
wherein the laminated body includes: a substrate and the storage layer (A), and
wherein the storage layer (A) contains: a resin (a100) which is at least one of an epoxy resin and an acrylic resin, inorganic particles (a2), and a nonionic surfactant (a300),
the liquid composition containing an ionic surfactant.

EXAMPLES

Hereinafter, Embodiment A will be described in more detail with reference to examples and the like, but the invention of Embodiment A is not limited only to these examples.

[Evaluation of Physical Properties of Laminated Body]

In the Examples, physical properties of each laminated body were evaluated as follows.

(Measurement of Film Thickness)

The film thickness of each layer was calculated by spectroscopic measurement. Specifically, spectral reflectance was measured for the vicinity of a center of a film formation sample using a film thickness measuring apparatus (ETA-ARC, manufactured by OPTOTECH), and a film thickness of each single layer or the two-layer laminated state was calculated from the obtained spectral reflectance by a Fourier transform method.

(Breath Antifogging Property)

Breath was blown onto a surface of the buffer layer in the laminated body for several seconds to visually confirm presence or absence of fogging on the surface of the buffer layer in the laminated body, and evaluation was performed according to the following evaluation criteria.

The evaluation of the breath antifogging property was performed on the laminated body that had been left to stand at room temperature 22° C. for 1 hour.

In addition, in the following Examples and Comparative Examples, the "initial breath antifogging property" refers to the breath antifogging property of the laminated body before "evaluation after immersion in pure water" which will be described later.

—Evaluation Criteria—

A: When breath was blown, the surface of the buffer layer in the laminated body was not fogged.

B: When breath was blown, the surface of the buffer layer in the laminated body was fogged.

(Contact Angle)

A contact angle of pure water on the surface of the buffer layer of the laminated body was measured using a contact angle meter (DropMaster Model DMs-401, manufactured by Kyowa Interface Science Co., Ltd.). The measurement was performed at three points for one sample, and an average value of these values was taken as a value of the contact angle.

Here, as the value of the contact angle, the contact angle after 21 seconds from droplet arrival is indicated.

In the following Examples and Comparative Examples, the "initial contact angle" refers to the contact angle of the laminated body before the "evaluation after immersion in pure water" which will be described later.

(50° C. Steam Antifogging Property)

Pure water was put in a beaker, and heated to 50° C. After a temperature of the pure water in the beaker reached 50° C., the laminated body was placed on an upper portion of the beaker and retained for 10 minutes. Then, in that state, the laminated body was visually observed from above to confirm whether the sample was fogged or the image was distorted. A time from the start of the retention until fogging of the laminated body or image distortion was confirmed is indicated in Table 1.

Note that the ">10 min" in Table 1 means that no fogging of the laminated body or image distortion was confirmed within 10 minutes after the start of the retention.

In the following Examples and Comparative Examples, the "initial 50° C. steam antifogging property" refers to 50° C. steam antifogging property of the laminated body before the "evaluation after immersion in pure water" which will be described later.

(Evaluation after Immersion in Pure Water)

The laminated body was immersed in pure water for 1 hour and dried using an air blow, and then the breath antifogging property, the contact angle, and the 50° C. steam antifogging property were evaluated.

The influence of immersion in pure water for 1 hour on the breath antifogging property, the contact angle, and the 50° C. steam antifogging property was evaluated based on the above to evaluate antifogging durability.

Examples 1 to 10 and Comparative Example 2

(Preparation of Storage Layer Forming Composition (A-1))

Under a normal-temperature and normal-pressure environment, each of the surfactant (a3) as indicated in Tables 1 and 2 and the inorganic particles (a2) as indicated in Tables 1 and 2 was added to a glass screw tube bottle in an amount corresponding to the content mass as indicated in Tables 1 and 2. Further, the mixture was stirred using a magnet stirrer and a stirrer until the surfactant was completely dissolved.

Next, the polyfunctional monomer (a1) and the polyfunctional monomer (a4) as indicated in Tables 1 and 2 were added to the glass screw tube bottle after stirring in amounts corresponding to the content masses as indicated in Tables 1 and 2, and the mixture was stirred well until they became compatible. Then, the polymerization initiator as indicated in Tables 1 and 2 was added to the glass screw tube bottle after stirring in an amount corresponding to the content mass as indicated in Tables 1 and 2, and the mixture was stirred until it was completely dissolved, thereby obtaining a storage layer forming composition (A-1), which was a liquid composition.

(Preparation of Buffer Layer Forming Composition (B-1))

Under a normal-temperature and normal-pressure environment, each of the surfactant (b3) as indicated in Tables 1 and 2 and the inorganic particles (b2) as indicated in Tables 1 and 2 was added to a glass screw tube bottle in an amount corresponding to the content mass as indicated in Tables 1 and 2. Further, the mixture was stirred using a magnet stirrer and a stirrer until the surfactant was completely dissolved.

Next, the solvent as indicated in Tables 1 and 2 and the polyfunctional monomer (b1) and the polyfunctional monomer (b4) as indicated in Tables 1 and 2 were each added to the glass screw tube bottle after stirring in an amount corresponding to the content mass as indicated in Tables 1 and 2, and the mixture was stirred well until they became compatible. Then, the polymerization initiator as indicated in Tables 1 and 2 was added to the glass screw tube bottle after stirring in an amount corresponding to the content mass as indicated in Tables 1 and 2, and the mixture was stirred until it was completely dissolved, thereby obtaining a buffer layer forming composition (B-1), which was a liquid composition.

The content mass (% by mass) of the solvent (propylene glycol monoethyl ether) contained in the buffer layer forming composition (B-1) as indicated in Tables 1 and 2 is the content mass thereof with respect to the total content mass, where the total content mass of the components contained in the buffer layer forming composition (B-1) other than the solvent is 100% by mass.

(Manufacture of Laminated Body)

The storage layer forming composition (A-1) was applied to CR-39 (φ 70) (polyallyl carbonate plate (65 mm in length×65 mm in width×2 mm in thickness)) by spin coating. The spin coating was performed by using the storage layer forming composition (A-1) as a coating liquid, flowing the coating liquid from above the CR-39 plate while the CR-39 plate was rotated at 500 rpm for 10 seconds, gradually spreading the coating liquid on the plate, and then rotating the plate at 1000 rpm for 10 seconds, thereby obtaining a first applied film (that is, first applied material layer).

Subsequently, the first applied film formed on the CR-39 plate was heated at 110° C. for 30 minutes to cure the first applied film, thereby obtaining a storage layer.

Next, the buffer layer forming composition (B-1) was applied onto the storage layer by spin coating to obtain a second applied film (that is, second applied material layer). At this time, the buffer layer forming composition (B-1) was applied under the same conditions as the spin coating conditions when the applied film (A-1) was formed.

Subsequently, the second applied film formed on the storage layer was heated at 110° C. for 60 minutes to remove the solvent in the second applied film, and the first applied film was cured to obtain a buffer layer.

By the above operation, a transparent laminated body including the CR-39 plate, the storage layer, and the buffer layer disposed in this order was obtained.

Comparative Example 1

The same operation as in Example 1 was performed except that the kinds and content masses of the surfactant (a3), the inorganic particles (a2), the polyfunctional monomer (a1), the polyfunctional monomer (a4), and the polymerization initiator were changed as indicated in Table 2 in the preparation of the storage layer forming composition (A-1), the buffer layer forming composition (B-1) was not used, and the operation for obtaining a buffer layer was not performed.

That is, the laminated body of Comparative Example 1 is a laminated body including the CR-39 plate and the storage layer and not including a buffer layer.

The evaluation results of each of Examples 1 to 10 and Comparative Examples 1 and 2 are indicated in Table 1 or Table 2 below.

In all of the laminated bodies obtained in Examples 1 to 10 and the laminated body obtained in Comparative Example 2, the film thickness of the storage layer was 8.0 μm, and the film thickness of the buffer layer was 3.0 μm.

In the laminated body obtained in Comparative Example 2, the film thickness of the storage layer was 8.0 μm.

TABLE 1

| | | | Example 1 | Example 2 | Example 3 | Example 4 | Example 5 |
|---|---|---|---|---|---|---|---|
| Storage layer (A-1) | | Storage layer forming composition | A1 | A2 | A3 | A4 | A5 |
| | Inorganic particles (a2) | Epoxy-modified silica sol solid content: 30% by mass | 52.4% | 52.4% | 57.6% | 61.7% | — |
| | | Epoxy-unmodified silica sol solid content: 30% by mass | — | — | — | — | 48.3% |
| | Polyfunctional monomer (a1) | DENACOL EX-841 epoxy equivalent: 372, molecular weight: 702 | 10.9% | 10.9% | 9.6% | 8.6% | 14.9% |
| | | DENACOL EX-1610 epoxy equivalent: 170, molecular weight: 868 | 26.2% | 26.2% | 23.0% | 20.6% | — |
| | | DENACOL EX-313 epoxy equivalent: 141, molecular weight: 204 | — | — | — | — | 25.3% |
| | Polyfunctional monomer (a4) | ARON OXETANE OXT-221 | 6.5% | 6.5% | 5.8% | 5.1% | 7.5% |
| | Polymerization initiator | San Aid SI-60L solid content: 32% by mass | 1.0% | — | — | — | — |
| | | Alumichelate A(W) | — | 1.0% | 1.0% | 1.0% | 1.0% |
| | Surfactant (a3) | NOIGEN LP-100 | 3.00% | 3.00% | 3.00% | 3.00% | 3.00% |
| | | Inorganic particles (a2)/ polyfunctional monomer (a1) mass ratio | 1.2 | 1.2 | 1.5 | 1.8 | 1 |
| Buffer layer (B-1) | | Buffer layer forming composition | B1 | B2 | B3 | B4 | B5 |
| | Inorganic particles (b2) | Epoxy-modified silica sol solid content: 30% by mass | 64.5% | 58.5% | 63.3% | 65.8% | — |
| | | Epoxy-unmodified silica sol solid content: 30% by mass | — | — | — | — | 59.1% |
| | Polyfunctional monomer (b1) | DENACOL EX-841 epoxy equivalent: 372, molecular weight: 702 | 8.5% | 9.8% | 8.9% | 8.2% | 9.9% |
| | | DENACOL EX-1610 epoxy equivalent: 170, molecular weight: 868 | 20.4% | 13.6% | 12.3% | 11.4% | — |
| | | DENACOL EX-313 epoxy equivalent: 141, molecular weight: 204 | — | 15.6% | 14.0% | 13.1% | 23.6% |

TABLE 1-continued

|  |  |  | Example 1 | Example 2 | Example 3 | Example 4 | Example 5 |
|---|---|---|---|---|---|---|---|
|  | Polyfunctional monomer (b4) | ARON OXETANE OXT-221 | 5.1% | — | — | — | 5.9% |
|  | Solvent | Propylene glycol monoethyl ether | 0% | 5.6% | 0% | 0% | 4.8% |
|  | Polymerization initiator | San Aid SI-60L solid content: 32% by mass | 1.0% | — | — | — | — |
|  |  | Alumichelate A(W) | — | 2.0% | 1.0% | 1.0% | 1.0% |
|  | Surfactant (b3) | NOIGEN LP-100 | 0.50% | 0.50% | 0.50% | 0.50% | 0.50% |
|  | Inorganic particles (b2)/ polyfunctional monomer (b1) mass ratio |  | 1.8 | 1.5 | 1.8 | 2.0 | 1.5 |
| Evaluation results | Initial | Breath defogging property | A | A | A | A | A |
|  |  | Contact angle (°) | 2.1 | 2.7 | 3.4 | 5.1 | 3.4 |
|  |  | 50° C. Steam antifogging property | >10 min | >10 min | >10 min | >10 min | >10 min |
|  | After immersion in pure water for 1 h | Breath defogging property | A | A | A | A | A |
|  |  | Contact angle (°) | 4.6 | 6.7 | 8.5 | 25.3 | 4.0 |
|  |  | 50° C. Steam antifogging property | >10 min | >10 min | >10 min | >10 min | >10 min |

TABLE 2

|  |  |  | Example 6 | Example 7 | Example 8 | Example 9 | Example 10 | Comparative Example 1 | Comparative Example 2 |
|---|---|---|---|---|---|---|---|---|---|
| Storage layer (A-1) | Storage layer forming composition |  | A6 | A7 | A8 | A9 | A10 | A11 | A12 |
|  | Inorganic particles (a2) | Epoxy-modified silica sol solid content: 30% by mass | — | — | — | 26.2% | 52.4% | 52.4% | 52.4% |
|  |  | Epoxy-unmodified silica sol solid content: 30% by mass | 48.3% | 56.7% | 56.7% | 26.20% | — | — | — |
|  | Polyfunctional monomer (a1) | DENACOL EX-841 epoxy equivalent: 372, molecular weight: 702 | 14.9% | 11.2% | 11.2% | 10.9% | 10.9% | — | — |
|  |  | DENACOL EX-1610 epoxy equivalent: 170, molecular weight: 868 | — | — | — | 26.2% | 26.2% | 43.6% | 43.6% |
|  |  | DENACOL EX-313 epoxy equivalent: 141, molecular weight: 204 | 25.3% | 18.9% | 18.9% | — | — | — | — |
|  |  | ARON OXETANE OXT-221 | 7.5% | 7.7% | 7.7% | 6.5% | 6.5% | — | — |
|  | Polymerization initiator | San Aid SI-60L solid content: 32% by mass | — | 1.0% | 1.0% | 1.0% | — | — | — |
|  |  | San-Apro CP-210S | — | — | — | — | 2.0% | — | — |
|  |  | Alumichelate A(W) | 1.0% | 1.5% | 1.5% | 1.5% | — | 1.0% | 1.0% |
|  | Surfactant (a3) | NOIGEN LP-100 | 3.00% | 3.00% | 3.00% | 3.00% | 3.00% | 3.00% | 3.00% |
|  | Inorganic particles (a2)/ polyfunctional monomer (a1) mass ratio |  | 1 | 1.5 | 1.5 | 1.2 | 1.2 | 1.2 | 1.2 |
| Buffer layer (B-1) | Buffer layer forming composition |  | B6 | B7 | B8 | B9 | B10 | — | B12 |
|  | Inorganic particles (b2) | Epoxy-modified silica sol solid content: 30% by mass | — | — | — | 29.2% | 58.5% | — | 58.5% |
|  |  | Epoxy-unmodified silica sol solid content: 30% by mass | 58.5% | 63.0% | 62.4% | 29.3% | — | — | — |
|  | Polyfunctional monomer (b1) | DENACOL EX-841 epoxy equivalent: 372, molecular weight: 702 | 9.8% | 8.8% | 8.7% | 9.8% | 9.8% | — | — |
|  |  | DENACOL EX-1610 epoxy equivalent: 170, molecular weight: 868 | — | — | — | 13.6% | 13.6% | — | 10.5% |
|  |  | DENACOL EX-313 epoxy equivalent: 141, molecular weight: 204 | 23.4% | 21.0% | 20.8% | 15.6% | 15.6% | — | 28.5% |
|  |  | ARON OXETANE OXT-221 | 5.8% | 5.2% | 5.1% | — | — | — | — |

TABLE 2-continued

|  |  |  | Example 6 | Example 7 | Example 8 | Example 9 | Example 10 | Comparative Example 1 | Comparative Example 2 |
|---|---|---|---|---|---|---|---|---|---|
| Solvent | Propylene glycol monoethyl ether |  | 4.6% | 1.3% | 1.2% | 5.6% | 5.6% | — | 5.4% |
| Polymerization initiator | San Aid SI-60L solid content: 32% by mass |  | 1.0% | — | 1.0% | — | — | — | — |
| Surfactant | San-Apro CP-210S |  | — | — | — | — | 2.0% | — | — |
|  | Alumichelate A(W) |  | 1.0% | 1.5% | 1.5% | 2.0% | — | — | 2.0% |
| Surfactant (b3) | NOIGEN LP-100 |  | 0.50% | 0.50% | 0.50% | 0.50% | 0.50% | — | 0.50% |
|  | Inorganic particles (b2)/ polyfunctional monomer (b1) mass ratio |  | 1.5 | 1.8 | 1.8 | 1.5 | 1.5 | — | 1.5 |
| Evaluation results | Initial | Breath defogging property | A | A | A | A | A | B | B |
|  |  | Contact angle (°) | 2.7 | 3.6 | 4.0 | 3.5 | 3.7 | 71 7 | 53 4 |
|  |  | 50° C. Steam antifogging property | >10 min | >10 min | >10 min | >10 min | >10 min | 1 sec | 2 sec |
|  | After immersion in pure water for 1 h | Breath defogging property | A | A | A | A | A | B | B |
|  |  | Contact angle (°) | 4.2 | 6.6 | 8.0 | 5 2 | 6.5 | 75.9 | 71.8 |
|  |  | 50° C. Steam antifogging property | >10 min | >10 min | >10 min | >10 min | >10 min | 1 sec | 1 sec |

The symbol "%" representing the amount of each component in each layer in Tables 1 and 2 means the content mass (% by mass) of the corresponding component with respect to the total mass of each layer.

The symbol "-" in Tables 1 and 2 means that the corresponding component is not contained.

In Tables 1 and 2, the "solid content" for the amount of the inorganic particles (a2) refers to a mass of components other than the contained solvent in a mass of a corresponding sol when the inorganic particles (a2) are used in the form of the corresponding sol.

In Tables 1 and 2, the "total dry mass" refers to a mass obtained by subtracting a sum of the total mass of the solvent indicated in the "solvent" section and the total mass of the solvent that can be contained in the components indicated in sections other than the "solvent" section from the total mass of the composition. For example, the silica sol contains a solvent.

Details of the terms indicated in Table 1 or Table 2 are as follows.

Epoxy-modified silica sol (MEK-EC-2430Z manufactured by Nissan Chemical Corporation, solid content: 30%)

Epoxy-unmodified silica sol (PGM-ST manufactured by Nissan Chemical Corporation, solid content: 30% by mass)

DENACOL EX-841 (epoxy equivalent: 372, molecular weight: 702, manufactured by Nagase ChemteX Corporation, containing a compound represented by the following formula as a main component)

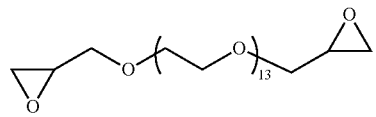

DENACOL EX-1610 (epoxy equivalent: 170, molecular weight: 868, manufactured by Nagase ChemteX Corporation, containing a compound represented by the following formula as a main component)

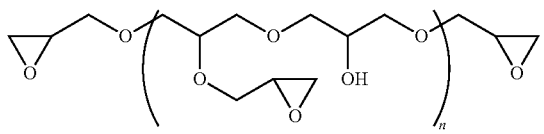

$n = 4$ (estimated)

DENACOL EX-313 (epoxy equivalent: 141, molecular weight: 204, manufactured by Nagase ChemteX Corporation, containing a compound represented by the following formula as a main component)

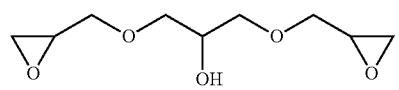 [SMILES: OC(COCC1CO1)COCC1CO1]

ARON OXETANE OXT-221 (manufactured by TOAGO-SEI CO., LTD.)

San Aid SI-60L (thermal acid generator manufactured by Sanshin Chemical Industry Co., Ltd., containing a compound represented by the following formula as a main component, solid content: 32% by mass)

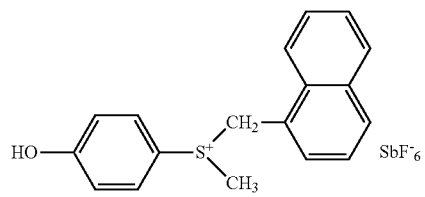

Alumichelate A(W) (aluminum chelator containing a compound represented by the following formula as a main component, manufactured by Kawaken Fine Chemicals Co., Ltd., solid content: 100%)

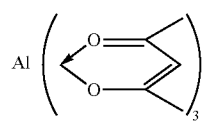

NOIGEN LP-100 (polyoxyalkylene lauryl ether manufactured by DKS Co., Ltd.)

As shown in Tables 1 and 2, the laminated bodies according to the Examples in which the content mass of the inorganic particles (a2) with respect to the total mass of the storage layer (A) and the content mass of the inorganic particles (b2) with respect to the total mass of the buffer layer (B) were 30% by mass or more, the polyfunctional monomer (a1) contained the polyfunctional monomer (a1-1) having an epoxy equivalent of 200 g/mol or more, and the polyfunctional monomer (b1) contained the polyfunctional monomer (b1-1) having an epoxy equivalent of 200 g/mol or more exhibited a favorable mechanical strength because the content mass of the inorganic particles was 30% by mass or more. In addition, they were evaluated to be excellent in breath antifogging property, contact angle, and 50° C. steam antifogging property.

On the other hand, the laminated body according to Comparative Example 1 with no buffer layer was inferior to those of the Examples in breath defogging property, contact angle, and 50° C. steam antifogging property.

Comparative Example 2 in which the storage layer (A) did not contain the polyfunctional monomer (a1-1) having an epoxy equivalent of 200 g/mol or more and the buffer layer (B) did not contain the polyfunctional monomer (b1-1) having an epoxy equivalent of 200 g/mol or more was inferior to the Examples in the breath defogging properties, the contact angle, and the 50° C. steam antifogging property were inferior.

The disclosure of Japanese Patent Application No. 2019-207311 filed on Nov. 15, 2019 is incorporated herein by reference in its entirety.

All documents, patent applications, and technical standards described herein are incorporated herein by reference to the same extent as if each document, patent application, and technical standard are specifically and individually indicated to be incorporated by reference.

Hereinafter, examples of Embodiment B will be described, but Embodiment B is not limited to the following examples.

[Preparation of Storage Layer (A)-Forming Compositions A101 to A106 and Buffer Layer (B)-Forming Compositions B102 and B103]

Storage layer (A)-forming compositions A101 to A106 and buffer layer (B)-forming compositions B102 and B103, each containing each component shown in the following Tables 3 and 4 and propylene glycol monomethyl ether as a diluent solvent, were prepared.

TABLE 3

| | Storage layer (A)-forming composition | | A101 | A102 | A103 | A104 | A105 | A106 |
|---|---|---|---|---|---|---|---|---|
| | Resin (a100) | | Epoxy resin | Epoxy resin | Acrylic resin | Epoxy resin | Epoxy resin | Epoxy resin |
| Component (parts by mass) | Resin (a100)-forming monomer | DENACOL EX-841 | 22.8 | 28.8 | — | 22.8 | 22.8 | 22.8 |
| | | DENACOL EX-313 | 9.1 | — | — | 9.1 | 9.1 | 9.1 |
| | | DENACOL EX-521 | 13.7 | 19.2 | — | 13.7 | 13.7 | 13.7 |
| | | NK Ester A-1000 | — | — | 43.0 | — | — | — |
| | Inorganic particles (a2) | Epoxy-unmodified silica sol (solid content) | 50.2 | 48.0 | — | 50.2 | 50.2 | 50.2 |
| | | Acryl-modified silica sol (solid content) | — | — | 51.7 | — | — | — |
| | Polymerization initiator | San Aid SI-60L | 1.0 | 1.0 | — | 1.0 | 1.0 | 1.0 |
| | | Omnirad 184 | — | — | 2.3 | — | — | — |
| | Nonionic surfactant (a300) | NOIGEN LP-100 | 3.0 | 3.0 | 3.0 | — | 2.0 | 7.0 |
| Mass ratio [inorganic particles (a2)/resin (a100)-forming monomer] | | | 1.1 | 1.0 | 1.2 | 1.1 | 1.1 | 1.1 |

TABLE 4

| | Buffer layer (B)-forming composition | | B102 | B103 |
|---|---|---|---|---|
| | Resin (b1) | | Epoxy resin | Acrylic resin |
| Component (parts by mass) | Resin (b1)-forming monomer | DENACOL EX-841 | 15.7 | — |
| | | DENACOL EX-313 | 9.0 | — |
| | | DENACOL EX-521 | 20.0 | — |
| | | NK Ester A-BPE-30 | — | 7.9 |
| | | Epoxy Ester 80MFA | — | 31.5 |
| | Inorganic particles (b2) | Epoxy-modified silica sol (solid content) | 53.8 | 55.1 |
| | Polymerization initiator | San Aid SI-60L | 1.0 | — |
| | | Omnirad 184 | — | 5.0 |
| | Nonionic surfactant (b3) | NOIGEN LP-100 | 0.5 | 0.5 |
| Mass ratio [inorganic particles (b2)/resin (b1)-forming monomer] | | | 1.2 | 1.4 |

The symbol "-" in Tables 3 and 4 means that the corresponding component is not contained.

In Tables 3 and 4, the amount of the inorganic particles represents the amount of the components other than the solvent (that is, solid content) in a sol (that is, silica sol) of the inorganic particles.

The components in Tables 3 and 4 are as follows.

DENACOL EX-841 (polyfunctional monomer for forming epoxy resin, specifically, polyethylene glycol diglycidyl ether manufactured by Nagase ChemteX Corporation, epoxy equivalent: 372)

DENACOL EX-521 (polyfunctional monomer for forming epoxy resin, specifically, polyglycerol polyglycidyl ether manufactured by Nagase ChemteX Corporation, epoxy equivalent: 183)

DENACOL EX-313 (polyfunctional monomer for forming epoxy resin, specifically, glycerol polyglycidyl ether manufactured by Nagase ChemteX Corporation, epoxy equivalent: 141)

NK Ester A-1000 (polyfunctional monomer for forming acrylic resin, specifically, polyethylene glycol diacrylate manufactured by Shin-Nakamura Chemical Co., Ltd.)

NK Ester A-BPE-30 (polyfunctional monomer for forming acrylic resin, specifically, ethoxylated bisphenol A diacrylate manufactured by Shin-Nakamura Chemical Co., Ltd.)

Epoxy Ester 80MFA (polyfunctional monomer for forming acrylic resin, specifically, Epolight 80MF acrylic acid adduct manufactured by Kyoeisha Chemical Co., Ltd.)

Unmodified silica sol (PGM-ST manufactured by Nissan Chemical Corporation, solid content: 30% by mass)

Acryl-modified silica sol (PGM-AC-2140Y manufactured by Nissan Chemical Corporation, solid content: 30% by mass)

Epoxy-modified silica sol (MEK-EC-2430Z manufactured by Nissan Chemical Corporation, solid content: 30% by mass)

San Aid SI-60L (cationic polymerization initiator manufactured by Sanshin Chemical Industry Co., Ltd., solid content: 32% by mass)

Omnirad 184 (radical polymerization initiator, specifically, 1-hydroxycyclohexyl-phenyl ketone manufactured by IGM Resins RV)

NOIGEN LP-100 (nonionic surfactant, specifically, polyoxyalkylene lauryl ether manufactured by DKS Co., Ltd.)

Example 101

<Manufacture of Laminated Body>

A composition A101 as the storage layer (A)-forming composition was applied, by dip coating, onto a lens substrate (RAV 7AX, a 70 mm diameter plano lens manufactured by Shanghai Conant Optics, made of allyl diglycol carbonate (ADC); hereinafter, also referred to as "ADC lens") as a substrate to obtain an applied film. The dip coating was performed by using the composition A101 in a PP beaker as a coating liquid, immersing the ADC lens in the coating liquid for 10 seconds, and then pulling up the ADC lens at a rate of 350 mm per minute.

The applied film formed on the substrate was heated under heating conditions: at 110° C. for 60 minutes and cured to form a storage layer A101 as the storage layer (A).

As described above, a laminated body including the substrate (the ADC lens in Example 101) and the storage layer (A) (the storage layer A101 in Example 101) was obtained.

<Application of Liquid Composition Containing Ionic Surfactant>

Two (2) g of a 25% by mass aqueous solution of sodium polyoxyethylene alkyl ether sulfate (AES) (specifically, "HITENOL 3255M" manufactured by DKS Co., Ltd.) as a liquid composition containing an ionic surfactant was attached to the surface of the storage layer (A) in the laminated body, and uniformly applied. Thereafter, the laminated body was left to stand in a temperature environment of 22° C. for 20 minutes, and the liquid composition was sufficiently blended with the surface of the storage layer (A). Next, the liquid composition on the surface of the storage layer (A) was washed away with tap water for 10 seconds, and the liquid composition remaining on the surface was blown off with an air blow and further wiped off with tissue paper.

<Evaluation>

Using the laminated body after the liquid composition was wiped off, the following evaluation was performed.

The evaluation results are shown in Table 5.

(Contact Angle)

A contact angle of the pure water on the surface of the storage layer (A) in the laminated body was measured using a contact angle meter (DropMaster Model DMs-401, manufactured by Kyowa Interface Science Co., Ltd.). The contact angle was measured 21 seconds after the pure water was deposited on the surface of the storage layer (A).

The contact angle was determined as an average value of the measured values at three points.

The smaller the contact angle, the better the antifogging properties.

(50° C. Steam Antifogging Property)

Pure water was put in a beaker, and heated to 50° C.

After the temperature of the pure water in the beaker reached 50° C., the laminated body was placed on the upper part of the beaker in an orientation in which the storage layer (A) was on the lower side (that is, the side facing the pure water).

While the laminated body was retained in this state for 10 minutes, the laminated body was visually observed from above to confirm the presence or absence of fogging.

A time from the start of the retention until fogging of the laminated body was confirmed is indicated in Table 5.

The longer the time, the better the antifogging properties.

The ">10 min" in Table 5 means that no fogging of the laminated body was confirmed within 10 minutes after the start of the retention.

(Number of Times of Recovery of Antifogging Properties)

The surface of the storage layer (A) of the laminated body after the liquid composition was wiped off was washed with flowing pure water for 5 seconds while being rubbed with a finger. Then, the surface was dried by air blowing.

Breath was blown onto the surface after drying for several seconds to visually confirm the presence or absence of fogging on the surface. In a case where the surface was fogged, the laminated body was left to stand for up to 24 hours to examine whether the surface was not fogged by breath (that is, whether the antifogging properties were recovered) (the above operation is referred to as "evaluation of breath defogging property").

In the evaluation of the breath defogging property, when the surface was not fogged even at a first breath blowing stage and when the surface was fogged by first breath blowing but the antifogging properties were recovered within 24 hours, the washing with pure water and the drying were performed again.

After drying, the breath defogging property was evaluated again.

The above cycle was repeated, and the cycle was terminated when the antifogging properties were not recovered even when the laminated body was left to stand for 24 hours.

The number of times of water washing in the process until the end of the cycle was defined as number of times of recovery of the antifogging properties.

The larger the number of times of recovery of the antifogging properties, the better the antifogging properties (specifically, recoverability of the antifogging properties).

The "22 times or more" in Table 5 means that even after water washing was performed 22 times, the surface was not fogged even at the first breath blowing stage, or the surface was fogged by the first breath blowing but the antifogging properties were recovered within 24 hours.

Example 103

Except for the following points, the same operation as in Example 101 was performed.

The evaluation results are shown in Table 5.

Difference from Example 101

A composition A102 as the storage layer (A)-forming composition was used in place of the composition A101 as the storage layer (A)-forming composition to form a storage layer A102 as the storage layer (A) in place of the storage layer A101 as the storage layer (A) (see Table 5). The conditions for heating the applied film formed of the storage layer (A)-forming composition were changed to 80° C. and 20 minutes.

Composition B102 as the buffer layer (B)-forming composition was applied onto the storage layer (A) by dip coating to obtain an applied film. The dip coating was performed by using the composition B102 in a PP beaker as a coating liquid, immersing the substrate in the coating liquid for 10 seconds, and then pulling up the substrate at a rate of 300 mm per minute.

The applied film formed of the buffer layer (B)-forming composition formed on the storage layer (A) was under heating conditions: at 110° C. for 60 minutes and cured to form a buffer layer B102 as the buffer layer (B).

As described above, a laminated body including the substrate (the ADC lens in Example 103), the storage layer (A) (the storage layer A102 in Example 103), and the buffer layer (B) (the buffer layer B102 in Example 103) disposed in this order was obtained.

The application of the liquid composition containing an ionic surfactant and each evaluation were performed in the same manner as in Example 101 except that "the surface of the storage layer (A)" was read as "the surface of the buffer layer (B)".

Example 105

Except for the following points, the same operation as in Example 103 was performed.

The evaluation results are shown in Table 5.

Difference from Example 103

In place of the ADC lens (φ 70 mm) as the substrate, a polycarbonate (PC) plate (65 mm in length×65 mm in width×2 mm in thickness)) as the substrate was used.

The method of applying the storage layer (A)-forming composition was changed from dip coating to spin coating. Spin coating was performed as follows. First, while the polycarbonate plate was rotated at a rotation speed of 500 rpm for 10 seconds, the storage layer forming composition (A103) as the coating liquid was given onto the polycarbonate plate and gradually spread, and then the polycarbonate plate was rotated at 1000 rpm for 10 seconds to apply and spread the coating liquid.

The applied film was cured by the storage layer (A)-forming composition by irradiating the applied film with ultraviolet rays (UV) instead of heating the applied film.

The UV irradiation was performed by irradiating the applied film with UV from a 1 kw UV light source for 5 seconds using a UV irradiation apparatus UB012-0BM manufactured by Eye Graphics Co., Ltd. as a UV irradiation apparatus. At this time, an integrated light amount was 350 mJ/cm$^2$ for UV-C and 1300 mJ/cm$^2$ for UV-A.

The method of applying the buffer layer (B)-forming composition was changed from dip coating to spin coating. The conditions for spin coating were the same as those for spin coating of the storage layer (A)-forming composition.

The applied film was cured by the buffer layer (B)-forming composition by irradiating the applied film with ultraviolet rays (UV) instead of heating the applied film. The UV irradiation was performed by irradiating the applied film formed of the buffer layer (B)-forming composition with UV from a 1 kw UV light source for 10 seconds using a UV irradiation apparatus UB012-0BM manufactured by Eye Graphics Co., Ltd. as a UV irradiation apparatus.

Example 107

Except for the following points, the same operation as in Example 101 was performed.

The evaluation results are shown in Table 5.

Difference from Example 101

A composition A105 as the storage layer (A)-forming composition was used in place of the composition A101 as the storage layer (A)-forming composition to form a storage layer A105 as the storage layer (A) in place of the storage layer A101 as the storage layer (A) (see Table 5).

Examples 102, 104, 106, and 108

Except for the following points, the same operation as in each of Examples 101, 103, 105 and 107 was performed.

The evaluation results are shown in Table 5.

Difference from Each of Examples 101, 103, 105, and 107

An operation of subjecting the laminated body to a water immersion treatment was added between the manufacture of the laminated body and the application of the liquid composition containing an ionic surfactant.

The water immersion treatment was performed by immersing the entire laminated body in water for 3 hours, taking out the laminated body, blowing off water remaining on the surface of the taken-out laminated body with an air blow, and then wiping off water with a tissue paper.

—Contact Angles Before and After Water Immersion Treatment—

In Examples 102, 104, 106, and 108 and Example 109 to 111 which will be described later, most of the nonionic surfactant (a300) was released from the storage layer (A) by the water immersion treatment.

In Examples 102, 104, 106, and 108, and Examples 109 to 111 which will be described later, before and after the water immersion treatment, the contact angle of the pure water on the surface of the laminated body on which the storage layer (A) was disposed was measured by the same method as the method of measuring the contact angle indicated in the item "Evaluation".

As a result, in all the Examples, the contact angle of the pure water before the water immersion treatment was from 4° to 12°, but the contact angle of the pure water after the water immersion treatment was 15° or higher.

From the above results, in Examples 102, 104, 106, and 108 and Examples 109 to 111 which will be described later, it was confirmed that at least a part of the nonionic surfactant (a300) was released from the storage layer (A) by the water immersion treatment.

Example 109

Except for the following points, the same operation as in Example 108 was performed.
The evaluation results are shown in Table 5.

Difference from Example 108

A composition A106 as the storage layer (A)-forming composition was used in place of the composition A105 as the storage layer (A)-forming composition to form a storage layer A106 as the storage layer (A) in place of the storage layer A105 as the storage layer (A) (see Table 5).

Example 110

Except for the following points, the same operation as in Example 102 was performed.
The evaluation results are shown in Table 5.

Difference from Example 102

In the "Application of liquid composition containing ionic surfactant", the 25% by mass aqueous solution of sodium polyoxyethylene alkyl ether sulfate (AES) (ionic surfactant) ("HITENOL 325SM" manufactured by DKS Co., Ltd.) as the liquid composition containing an ionic surfactant was changed to a 25% by mass aqueous solution of sodium linear alkylbenzene sulfonate (LAS) (ionic surfactant) (manufactured by FUJIFILM Wako Pure Chemical Corporation).

Example 111

The same operation as in Example 101 was performed except that the ADC substrate was changed to a thiourethane substrate manufactured as follows.
The evaluation results are shown in Table 5.

—Manufacture of Thiourethane Substrate—

A mixed solution was prepared by charging 0.035 parts by mass of dibutyltin dichloride, 0.1 parts by mass of ZelecUN manufactured by STEPAN, 50.6 parts by mass of a mixture of 2,5-bis(isocyanatomethyl)bicyclo-[2.2.1]-heptane and 2,6-bis(isocyanatomethyl)bicyclo-[2.2.1]-heptane, 1.5 parts by mass of Viosob583 manufactured by BASF as an ultraviolet absorber, and 0.00005 parts by mass of PlastBlue8514 manufactured by Arimoto Chemical Co., Ltd. This mixed solution was stirred at 25° C. for 1 hour to be completely dissolved, thereby obtaining a preparation solution. Thereafter, 25.5 parts by mass of a thiol composition containing 4-mercaptomethyl-1,8-dimercapto-3,6-dithiaoctane and 23.9 parts by mass of a thiol composition containing pentaerythritol tetrakis(3-mercaptopropionate) were charged into this prepared solution, and the mixture was stirred at 25° C. for 30 minutes to obtain a uniform solution (polymerizable composition for optical materials). This polymerizable composition for optical materials was defoamed at 600 Pa for 1 hour, and then filtered with a 1 μm PTFE filter. The obtained filtrate (that is, the polymerizable composition for optical materials after filtration) was injected into a glass mold, and the temperature was raised from 25° C. to 120° C. over 16 hours. After the temperature rise, the product was cooled to room temperature, and removed from the glass mold to obtain a thiourethane resin substrate having a diameter of 81 mm.

The film thicknesses of the storage layers (A) in the laminated bodies of Example 101 to 111 were all 8.0 μm.
The film thicknesses of the buffer layers (B) in the laminated bodies of Example 103 to 106 were all 3.0 μm.
The film thickness of each layer was measured using a film thickness measuring apparatus (ETA-ARC, manufactured by OPTOTECH).

Comparative Example 101

Except for the following points, the same operation as in Example 101 was performed.
The evaluation results are shown in Table 6.

Difference from Example 101

A hard coat layer (HC) was formed in place of the storage layer A101 as the storage layer (A) by using a hard coat liquid MP-1179 manufactured by SDC in place of the composition A101 as the storage layer (A)-forming composition (see Table 6). The conditions for heating the applied film were changed to 120° C. and 2 hours.

As described above, a laminated body including the substrate (ADC lens) and the hard coat layer (HC) was obtained.

The application of the liquid composition containing an ionic surfactant and each evaluation were performed in the same manner as in Example 101 except that "the surface of the storage layer (A)" was read as "the surface of the hard coat layer".

Comparative Example 102

Except for the following points, the same operation as in Comparative Example 101 was performed.
The evaluation results are shown in Table 6.

Difference from Comparative Example 101

An antireflection layer (AR) including five layers was disposed on the hard coat layer in Comparative Example 101 by a vacuum vapor deposition method, and a fluorine-based water-repellent coat layer was further vapor-deposited to obtain a laminated body including the substrate (ADC lens), the hard coat layer (HC), the antireflection layer (AR) including five layers, and the water-repellent coat layer (RC) disposed in this order.

The application of the liquid composition containing an ionic surfactant and each evaluation were performed in the same manner as in Example 101 except that "the surface of the storage layer (A)" was read as "the surface of the water-repellent layer".

Comparative Example 103

Except for the following points, the same operation as in Example 101 was performed.
The evaluation results are shown in Table 6.

Difference from Example 101

In place of the composition A101 as the storage layer (A)-forming composition, a composition A104 as a comparative composition containing no nonionic surfactant was used to form a storage layer A104 as a comparative layer containing no nonionic surfactant in place of the storage layer A101 as the storage layer (A) (see Table 6).

Comparative Example 104

Except for the following points, the same operation as in Example 102 was performed.
The evaluation results are shown in Table 6.

Difference from Example 102

In the "Application of liquid composition containing ionic surfactant", sodium polyoxyethylene alkyl ether sulfate (AES), as the ionic surfactant, was changed to NOIGEN LP-100 (polyoxyalkylene lauryl ether manufactured by DKS Co., Ltd.), as the nonionic surfactant.

TABLE 5

| | | | Example 101 | Example 102 | Example 103 | Example 104 | Example 105 | Example 106 |
|---|---|---|---|---|---|---|---|---|
| Laminated body | Substrate | | ADC | ADC | ADC | ADC | PC | PC |
| | Storage layer (A) or comparative layer | No. | A101 | A101 | A102 | A102 | A103 | A103 |
| | | Content (% by mass) of nonionic surfactant (a300) | 3.0% | 3.0% | 3.0% | 3.0% | 3.0% | 3.0% |
| | Buffer layer (B) | | None | None | B102 | B102 | B103 | B103 |
| | Water immersion treatment | | Not treated | Treated | Not treated | Treated | Not treated | Treated |
| | Surfactant in liquid composition in application step | | Ionic surfactant (AES) | Ionic surfactant (AES) | Ionic surfactant (AES) | Ionic surfactant (AES) | Ionic surfactant (AES) | Ionic surfactant (AES) |
| Evaluation | Contact angle (°) | | 6.8 | 7.0 | 7.6 | 8.8 | 6.4 | 8.6 |
| | 50° C. Steam antifogging property | | >10 min | >10 min | >10 min | >10 min | >10 min | >10 min |
| | Number of times of recovery of antifogging properties | | 22 times or more | 22 times or more | 22 times or more | 22 times or more | 22 times or more | 22 times or more |

| | | | Example 107 | Example 108 | Example 109 | Example 110 | Example 111 |
|---|---|---|---|---|---|---|---|
| Laminated body | Substrate | | ADC | ADC | ADC | ADC | Thiourethane |
| | Storage layer (A) or comparative layer | No. | A105 | A105 | A106 | A101 | A101 |
| | | Content (% by mass) of nonionic surfactant (a300) | 2.0% | 2.0% | 7.0% | 3.0% | 3.0% |
| | Buffer layer (B) | | None | None | None | None | None |
| | Water immersion treatment | | Not treated | Treated | Treated | Treated | Not treated |
| | Surfactant in liquid composition in application step | | Ionic surfactant (AES) | Ionic surfactant (AES) | Ionic surfactant (AES) | Ionic surfactant (LAS) | Ionic surfactant (AES) |
| Evaluation | Contact angle (°) | | 9.6 | 9.6 | 7.0 | 8.8 | 6.8 |
| | 50° C. Steam antifogging property | | >10 min | >10 min | >10 min | >10 min | >10 min |
| | Number of times of recovery of antifogging properties | | 15 times | 15 times | 22 times or more | 22 times or more | 22 times or more |

TABLE 6

| | | | Comparative Example 101 | Comparative Example 102 | Comparative Example 103 | Comparative Example 104 |
|---|---|---|---|---|---|---|
| Laminated body | Substrate | | ADC | ADC | ADC | ADC |
| | Storage layer (A) or comparative layer | No. | HC | HC + AR + RC | A104 | A105 |
| | | Content (% by mass) of nonionic surfactant (a300) | 0% | 0% | 0% | 2.0% |
| | Buffer layer (B) | | None | None | None | None |
| | Water immersion treatment | | Not treated | Not treated | Not treated | Treated |

TABLE 6-continued

|  |  | Comparative Example 101 | Comparative Example 102 | Comparative Example 103 | Comparative Example 104 |
|---|---|---|---|---|---|
| Surfactant in liquid composition in application step | | Ionic surfactant (AES) | Ionic surfactant (AES) | Ionic surfactant (AES) | Nonionic surfactant |
| Evaluation | Contact angle (°) | 60.9 | 93.3 | 56.3 | 16.3 |
|  | 50° C. Steam antifogging property | 3 sec | 2 sec | 3 sec | 10 sec |
|  | Number of times of recovery of antifogging properties | 0 times | 0 times | 0 times | 15 times |

As shown in Tables 5 and 6, in each of the Examples in which the method of manufacturing an antifogging laminated body was carried out, the method including:

a step of preparing a laminated body including a substrate and a storage layer (A), the storage layer (A) containing a resin (a100) which is at least one of an epoxy resin and an acrylic resin, inorganic particles (a2), and a nonionic surfactant (a300); and a step of applying a liquid composition containing an ionic surfactant to a surface of the laminated body on a side where the storage layer (A) is disposed (that is, a surface of the storage layer (A) when the uppermost layer is the storage layer (A), and a surface of a buffer layer (B) when the uppermost layer is the buffer layer (B)), an antifogging laminated body could be manufactured by a simple method of applying the liquid composition containing an ionic surfactant (that is, the antifogging properties could be imparted to the laminated body).

Comparative Examples 101 to 103 in which a comparative layer not containing a nonionic surfactant was used in place of the storage layer (A) were inferior to each of the Examples in antifogging properties of the laminated body after application of the liquid composition.

In addition, Comparative Example 104 in which the liquid composition containing a nonionic surfactant was used instead of the liquid composition containing an ionic surfactant was also inferior to each of the Examples in antifogging properties of the laminated body after application of the liquid composition.

The invention claimed is:

1. A laminated body, comprising: a substrate; a storage layer (A); and a buffer layer (B) disposed in this order, wherein:
the storage layer (A) is formed of a cured product of a composition (A-1) containing: a polyfunctional monomer (a1) containing two or more epoxy groups; inorganic particles (a2); and a surfactant (a3),
the buffer layer (B) is formed of a cured product of a composition (B-1) containing: a polyfunctional monomer (b1) containing two or more epoxy groups; and inorganic particles (b2),
a mass content of the inorganic particles (a2) with respect to a total mass of the storage layer (A) is 30% by mass or more,
a mass content of the inorganic particles (b2) with respect to a total mass of the buffer layer (B) is 30% by mass or more,
the polyfunctional monomer (a1) contains a polyfunctional monomer (a1-1) having a molecular weight per epoxy group in one molecule of 200 g/mol or more, and that contains a polyfunctional monomer (a1-2) having a molecular weight per epoxy group in one molecule of less than 200 g/mol, and the polyfunctional monomer (b1) contains a polyfunctional monomer (b1-1) having a molecular weight per epoxy group in one molecule of 200 g/mol or more, and that contains a polyfunctional monomer (b1-2) having a molecular weight per epoxy group in one molecule of less than 200 g/mol.

2. The laminated body according to claim 1, wherein the mass content of the inorganic particles (b2) with respect to the total mass of the buffer layer (B) is larger than the mass content of the inorganic particles (a2) with respect to the total mass of the storage layer (A).

3. The laminated body according to claim 1, wherein each of the polyfunctional monomer (a1-1) and the polyfunctional monomer (b1-1) independently have an oxyalkylene structure.

4. The laminated body according to claim 1, wherein each of the polyfunctional monomer (a1-1) and the polyfunctional monomer (b1-1) independently have a molecular weight per epoxy group in one molecule of 500 g/mol or less.

5. The laminated body according to claim 1, wherein each of the polyfunctional monomer (a1-2) and the polyfunctional monomer (b1-2) independently contain a compound represented by the following Formula (1):

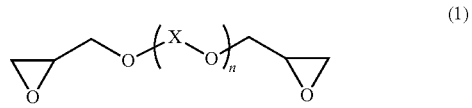

(1)

wherein, in Formula (1), X represents an alkylene group having from 2 to 6 carbon atoms, n is an integer from 1 to 5, and when n is an integer from 2 to 5, each X may be the same as or different from another X.

6. The laminated body according to claim 1, wherein:
the mass content of the inorganic particles (a2) with respect to the total mass of the storage layer (A) is from 30% by mass to 60% by mass, and
the mass content of the inorganic particles (b2) with respect to the total mass of the buffer layer (B) is from 40% by mass to 70% by mass.

7. The laminated body according to claim 1, wherein:
a mass content of the surfactant (a3) with respect to the total mass of the storage layer (A) is from 1.0% by mass to 5.0% by mass, and
the buffer layer (B) contains no surfactant, or a mass content of a surfactant (b3) with respect to the total mass of the buffer layer (B) is from more than 0% by mass to less than 1.0% by mass.

8. The laminated body according to claim 1, wherein:
the composition (A-1) further contains a polyfunctional monomer (a4) containing an oxetane ring, and the composition (B-1) further contains a polyfunctional monomer (b4) containing an oxetane ring.

9. The laminated body according to claim 1, wherein each of the composition (A-1) and the composition (B-1) independently contain at least one of a thermal polymerization initiator or a photopolymerization initiator as a polymerization initiator.

10. The laminated body according to claim 1, wherein each of the composition (A-1) and the composition (B-1) independently contain silica particles and contain an aluminum chelator and a thermal acid generator as the thermal polymerization initiator.

11. The laminated body according to claim 1, wherein a ratio of a thickness of the storage layer (A) to a thickness of the buffer layer (B) is in a range of from 1.3 to 15.

12. The laminated body according to claim 1, wherein the substrate comprises a plastic lens.

13. The laminated body according to claim 1, wherein:
a total mass content of the polyfunctional monomer (a1), the inorganic particles (a2), the surfactant (a3), and a polymerization initiator in the composition (A-1) is 95% by mass or more with respect to a total mass of the composition (A-1), and
a total mass content of the polyfunctional monomer (b1), the inorganic particles (b2), a surfactant (b3), and a polymerization initiator in the composition (B-1) is 95% by mass or more with respect to a total mass of the composition (B-1).

14. A method of manufacturing a laminated body according to claim 1, the method comprising:
a step (S1) of providing a coating material layer (A2) of a composition (A-la) containing a polyfunctional monomer (a1) containing two or more epoxy groups, inorganic particles (a2), a surfactant (a3), and a solvent (a4) on at least one surface of a substrate;
a step (S2) of removing the solvent (a4) from the coating material layer (A2);
a step (S3) of curing the coating material layer (A2) to obtain a storage layer (A);
a step (S4) of providing a coating material layer (B2) of a composition (B-la) containing a polyfunctional monomer (b1) containing two or more epoxy groups, inorganic particles (b2), a surfactant (b3), and a solvent (b4) on the storage layer (A) after the step (S3);
a step (S5) of removing the solvent (b4) from the coating material layer (B2); and
a step (S6) of curing the coating material layer (B2) to obtain a buffer layer (B).

15. The method according to claim 14, wherein a total dry mass of the composition (A-1) per 100 parts by mass of the composition (A-1) is from 46 parts by mass to less than 100 parts by mass.

16. The method according to claim 15, the method further comprising:
applying a liquid composition containing an ionic surfactant to a surface of the laminated body at a side at which the storage layer (A) is disposed and the surfactant (a3) is a nonionic surfactant (a300).

17. A composition for forming an antifogging film, the composition comprising: a polyfunctional monomer (x1) containing two or more epoxy groups; inorganic particles (x2); and a surfactant (x3), wherein:
a mass content of the inorganic particles (x2) with respect to a total dry mass of the composition is 30% by mass or more, and
the polyfunctional monomer (x1) contains a polyfunctional monomer (x1-1) having a molecular weight per epoxy group in one molecule of 200 g/mol or more, and that contains a polyfunctional monomer (x1-2) having a molecular weight per epoxy group in one molecule of less than 200 g/mol.

18. An antifogging film, obtained by curing the composition for forming an antifogging film according to claim 17.

* * * * *